United States Patent
Ishiguro et al.

(10) Patent No.: US 11,789,185 B2
(45) Date of Patent: Oct. 17, 2023

(54) REFLECTIVE SHEET

(71) Applicant: FUJIFILM Corporation, Tokyo (JP)

(72) Inventors: Makoto Ishiguro, Minamiashigara (JP); Hideki Kaneiwa, Minamiashigara (JP); Nobuhiko Ichihara, Minamiashigara (JP); Akira Yamamoto, Minamiashigara (JP); Ryuji Saneto, Minamiashigara (JP); Michio Nagai, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 306 days.

(21) Appl. No.: 17/214,076

(22) Filed: Mar. 26, 2021

(65) Prior Publication Data
US 2021/0223445 A1 Jul. 22, 2021

Related U.S. Application Data

(63) Continuation of application No. PCT/JP2019/032419, filed on Aug. 20, 2019.

(30) Foreign Application Priority Data

Sep. 28, 2018 (JP) ................................ 2018-183925

(51) Int. Cl.
G02B 5/02 (2006.01)
(52) U.S. Cl.
CPC ......... G02B 5/0263 (2013.01); G02B 5/0284 (2013.01)
(58) Field of Classification Search
None
See application file for complete search history.

(56) References Cited

U.S. PATENT DOCUMENTS 6,537,624 B1 3/2003 Suzuki et al.
6,627,270 B1 * 9/2003 Nishimura ............ G02F 1/1335
349/201

(Continued)

FOREIGN PATENT DOCUMENTS

JP 2004-302388 A 10/2004
JP 2005-49866 A 2/2005

(Continued)

OTHER PUBLICATIONS

Japanese Office Action for corresponding Japanese Application No. 2020-548154, dated Apr. 26, 2022, with English translation.

(Continued)

*Primary Examiner* — Ashok Patel
(74) *Attorney, Agent, or Firm* — Birch, Stewart, Kolasch & Birch, LLP

(57) ABSTRACT

Provided is a reflective sheet that includes a reflective layer having a wide reflection wavelength range, excellent diffusion reflection properties, and inconspicuous defects. The reflective sheet includes a plurality of reflective layers that are laminated, the reflective layers being obtained by immobilizing a cholesteric liquid crystalline phase, in a cross-section of the reflective layer observed with a scanning electron microscope, at least a part of bright portions and dark portions derived from the cholesteric liquid crystalline phase has a flapping structure, a helical pitch in one or more reflective layers changes in a thickness direction, and a thickness of a reflective layer that is formed on a surface other than a surface of the reflective layer is less than those of other reflective layers.

13 Claims, 2 Drawing Sheets

(56) References Cited

U.S. PATENT DOCUMENTS

2006/0083866 A1    4/2006  Hanelt
2009/0279042 A1*  11/2009  Akao .................. G02B 5/3016
                                                        349/187
2019/0391479 A1   12/2019  Katoh et al.

FOREIGN PATENT DOCUMENTS

| JP | 2006-154865 A | 6/2006 |
| JP | 2006-526797 A | 11/2006 |
| JP | 2010-11104 A | 1/2010 |
| WO | WO 2016/017728 A1 | 2/2016 |
| WO | WO 2016/098799 A1 | 6/2016 |
| WO | WO 2018/159751 A1 | 9/2018 |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2019/032419, dated Apr. 8, 2021, with English translation of the Written Opinion.
International Search Report (Form PCT/ISA/210) for International Application No. PCT/JP2019/032419, dated Oct. 1, 2019, with English translation.
Japanese Office Action for corresponding Japanese Application No. 2020-548154, dated Jan. 4, 2022, with English translation.

* cited by examiner

REFLECTIVE SHEET

CROSS-REFERENCE TO RELATED APPLICATIONS

This application is a Continuation of PCT International Application No. PCT/JP2019/032419 filed on Aug. 20, 2019, which claims priority under 35 U.S.C. § 119(a) to Japanese Patent Application No. 2018-183925 filed on Sep. 28, 2018. The above application is hereby expressly incorporated by reference, in its entirety, into the present application.

BACKGROUND OF THE INVENTION

1. Field of the Invention

The present invention relates to a reflective sheet that is used for a decorative sheet or the like.

2. Description of the Related Art

A cholesteric liquid crystal layer obtained by immobilizing a cholesteric liquid crystalline phase is known as a layer having properties in which at least either right circularly polarized light or left circularly polarized light in a specific wavelength range is selectively reflected. Therefore, the cholesteric liquid crystal layer are used in various applications, and, for example, the use as a decorative sheet is considered.

For example, JP2010-011104A describes a decorative sheet in which two cholesteric liquid crystal layers having different turning directions of circularly polarized light to be reflected are laminated.

In addition, JP2010-011104A describes that more satisfactory metallic gloss can be obtained by changing a helical pitch continuously or stepwise in a thickness direction in the two cholesteric liquid crystal layers. The wavelength range where the cholesteric liquid crystal layer selectively reflects light correlates to the length of a helical pitch of a helical structure in the cholesteric liquid crystal layer. Accordingly, in the cholesteric liquid crystal layer in which the helical pitch changes in the thickness direction, the selective reflection wavelength range is widened, and higher metallic gloss can be obtained.

In addition, it is preferable that the decorative sheet has diffusion reflection properties. However, reflection of light from the cholesteric liquid crystal layer is so-called specular reflection. For example, light incident from the normal direction is reflected in the normal direction.

Here, JP2005-049866A describes that a direction an alignment restriction force of an alignment film during the formation of a cholesteric liquid crystal layer is random and a direction of a director of a liquid crystal compound in contact with the alignment film is random.

In a case where a cross-section of the cholesteric liquid crystal layer is observed with a scanning electron microscope, a stripe pattern including bright portions and dark portions derived from the cholesteric liquid crystalline phase is observed. In a typical cholesteric liquid crystal layer that reflects light by specular reflection, this stripe pattern including bright portions and dark portions is linear in a plane direction.

On the other hand, in a cholesteric liquid crystal layer in which a direction of a director of a liquid crystal compound in contact with an alignment film is random as shown in JP2005-049866A, a helical axis of the liquid crystal compound faces various directions. As a result, this cholesteric liquid crystal layer has a flapping structure in which a stripe pattern including bright portions and dark portions is flapping in a thickness direction. In the cholesteric liquid crystal layer having the flapping structure, incidence light is diffused and reflected in a direction of a helical axis without being reflected by specular reflection.

SUMMARY OF THE INVENTION

It is preferable that the reflective sheet that includes the cholesteric liquid crystal layer and is used as a decorative sheet or the like can reflect light in a wide wavelength range with excellent diffusibility. To that end, for example, it is preferable that the cholesteric liquid crystal layer in which the bright portions and the dark portions have a flapping structure and the helical pitch changes in a thickness direction is thick.

However, the reflective sheet that includes the cholesteric liquid crystal layer, can reflect light in a wide wavelength range with excellent diffusibility, and has excellent properties such as inconspicuous unevenness has yet to be realized.

An object of the present invention is to solve the problems in the related art and to provide a reflective sheet that includes a cholesteric liquid crystal layer, can reflect light in a wide wavelength range with excellent diffusibility, and has excellent properties such as inconspicuous unevenness.

In order to achieve the object, the present invention has the following configurations.

[1] A reflective sheet comprising:
a plurality of reflective layers that are laminated, the reflective layers being obtained by immobilizing a cholesteric liquid crystalline phase,
in which in a cross-section of the reflective layer observed with a scanning electron microscope, at least a part of bright portions and dark portions derived from the cholesteric liquid crystalline phase has a flapping structure,
at least one of the reflective layers has a pitch gradient structure that is a structure in which a helical pitch changes in a thickness direction, and
in a case where a reflective layer that is formed on a surface other than a surface of the reflective layer among the plurality of reflective layers that are laminated is set as a lower reflective layer, a thickness of the lower reflective layer is less than those of other reflective layers.

[2] The reflective sheet according to [1],
in which the thickness of the lower reflective layer is 3.5 µm or less.

[3] The reflective sheet according to [1] or [2],
in which a thickness of at least one of the reflective layers other than the lower reflective layer is 4 µm or more.

[4] The reflective sheet according to any one of [1] to [3],
in which a thickness of at least one of the reflective layers other than the lower reflective layer is more than that of the lower reflective layer by 1 µm or more.

[5] The reflective sheet according to any one of [1] to [4],
in which at least one of the reflective layers other than the lower reflective layer has the pitch gradient structure.

[6] The reflective sheet according to [5],
in which all the reflective layers have the pitch gradient structure.

[7] The reflective sheet according to any one of [1] to [6],
in which a half-width of an integral reflection spectrum is 100 nm or more.

[8] The reflective sheet according to any one of [1] to [7], in which an average value of inter-peak distances in the flapping structures of the reflective layers is 0.5 to 50 µm.

[9] The reflective sheet according to any one of [1] to [8], in which the number of the reflective layers is two.

[10] The reflective sheet according to any one of [1] to [9], further comprising:
a support; and
an underlayer that is provided on one surface of the support,
in which the lower reflective layer is adjacent to the underlayer.

[11] The reflective sheet according to any one of [1] to [9], further comprising:
a support,
in which the lower reflective layer is adjacent to the support.

[12] The reflective sheet according to [10] or [11], in which the support is peelable.

According to the present invention, it is possible to provide a reflective sheet that includes a cholesteric liquid crystal layer, can reflect light in a wide wavelength range with excellent diffusibility, and has excellent properties such as inconspicuous unevenness.

DESCRIPTION OF THE PREFERRED EMBODIMENTS

Figure 1:
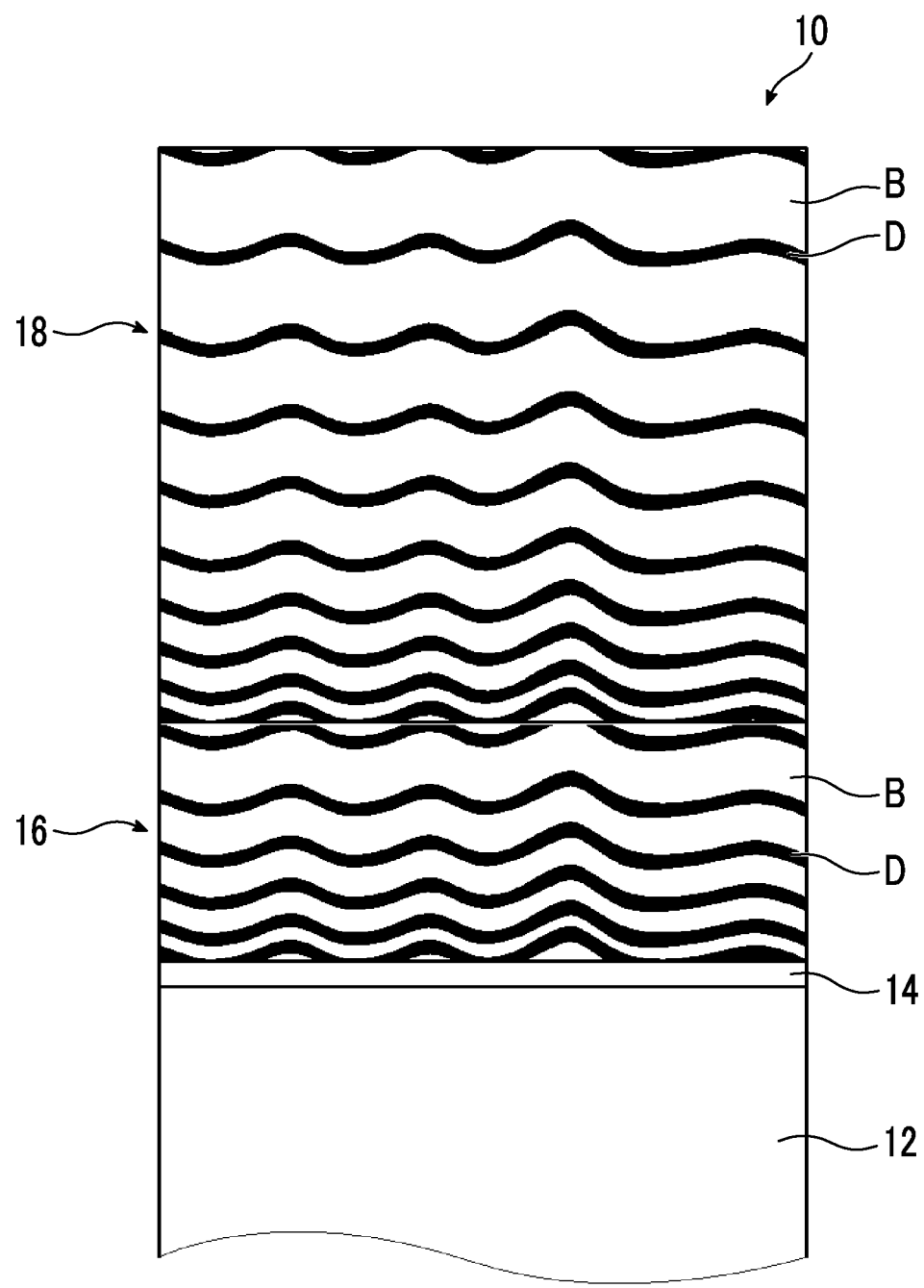
FIG. 1 is a cross-sectional view conceptually showing an example of a reflective sheet according to the present invention.

Hereinafter, the details of the present invention will be described.

The following description regarding components has been made based on a representative embodiment of the present invention. However, the present invention is not limited to the embodiment.

In the present invention, numerical ranges represented by "to" include numerical values before and after "to" as lower limit values and upper limit values.

In addition, in the present invention, a liquid crystal composition and a liquid crystal compound include those that exhibit liquid crystal properties by curing or the like.

<Integral Reflectivity>

Using a device in which a large integrating sphere device (ILV-471, manufactured by JASCO Corporation) is attached to a spectrophotometer (V-550, manufactured by JASCO Corporation), an integral reflectivity I-R($\lambda$) of a reflective sheet according to an embodiment of the present invention at a wavelength $\lambda$ may be measured by optical trap such that light is incident from a reflective layer surface (cholesteric liquid crystal layer surface) of the reflective sheet.

<Specular Reflectivity>

Using a device in which an absolute reflectivity measurement device (ARV-474, manufactured by JASCO Corporation) is attached to a spectrophotometer (V-550, manufactured by JASCO Corporation), a specular reflectivity S-R($\lambda$) of the reflective sheet according to the embodiment of the present invention at the wavelength $\lambda$ at an incidence angle of 5° may be measured such that light is incident from the reflective layer surface of the reflective sheet.

<Curing Rate>

In the present invention, a curing rate refers to a value obtained by measuring a consumption ratio of polymerizable functional groups using an infrared (IR) absorption spectrum.

For example, a sample is obliquely cut such that a thickness direction is exposed in a plane. An IR absorption spectrum of the formed sample piece is measured by attenuated total reflection-infrared spectroscopy (ATR-IR). The consumption ratio of polymerizable functional groups can be determined from a ratio between an absorption intensity based on a carbonyl group in the vicinity of 1720 $cm^{-1}$ and an absorption intensity based on a carbon-carbon double bond in the vicinity of 810 $cm^{-1}$ in the obtained absorption spectrum.

In a case where the curing rate in both interfaces of the reflective layer is determined, the curing rate may be obtained by measuring the IR absorption spectrum by ATR-IR regarding a region of the formed sample piece corresponding to two outermost regions among five regions that are equally divided in the thickness direction.

<Selective Reflection Center Wavelength and Half-Width>

In the present invention a selective reflection center wavelength of the reflective layer (cholesteric liquid crystal layer) and a half-width in a selective reflection wavelength range may be measured using the following method.

That is, in a case where the integral reflectivity is measured using the above-described method, a spectrum waveform having a peak shape (upward protrusion shape) in which the horizontal axis represents a wavelength is obtained. In this case, an average reflectivity (arithmetic mean) of a maximum value and a minimum value of the integral reflectivity is obtained. Among two wavelengths at two intersections between the waveform and the average reflectivity, in a case where a value of a wavelength on a short wavelength side is represented by $\lambda\alpha$ (nm) and a value of a wavelength on a long wavelength side is represented by $\lambda\beta$ (nm), the selective reflection wavelength is calculated from the following expression.

Selective Reflection Center Wavelength=$(\lambda\alpha+\lambda\beta)/2$

Half-Width=$(\lambda\beta-\lambda\alpha)$

Here, in the case of a sample having low diffusion reflection properties and strong specular reflection properties, a waveform of an integral reflection spectrum of the integral reflectivity may be scattered in a serrated shape. In this case, an average reflectivity (arithmetic mean) of a maximum value and a minimum value in a spectrum waveform of the above-described specular reflectivity is obtained. Among two wavelengths at two intersections between the waveform and the average reflectivity, in a case where a value of a wavelength on a short wavelength side is represented by $\lambda\alpha$ (nm) and a value of a wavelength on a long wavelength side is represented by $\lambda\beta$ (nm), the selective reflection wavelength may be calculated from the above-described expression.

In another method, by measuring a transmission spectrum of a sample using Axoscan manufactured by Axometrix Inc, the selective reflection center wavelength and the half-width can also be measured. By measuring the transmission spectrum, a transmission spectrum waveform having a valley shape (downward protrusion shape) in which the horizontal axis represents a wavelength is obtained. In this case, an average reflectivity (arithmetic mean) of a maximum value and a minimum value of the transmittance is obtained. Among two wavelengths at two intersections between the waveform and the average transmittance, in a case where a value of a wavelength on a short wavelength side is represented by $\lambda\alpha$ (nm) and a value of a wavelength on a long wavelength side is represented by $\lambda\beta$ (nm), the selective reflection center wavelength and the half-width are calculated from the above-described expressions.

FIG. 1 conceptually shows an example of the reflective sheet according to the embodiment of the present invention.

An reflective sheet 10 shown in FIG. 1 includes: a support 12; an underlayer 14 that is formed on one surface of the support 12; a first reflective layer 16 that is formed on a surface of the underlayer 14; and a second reflective layer 18 that is formed on a surface of the first reflective layer 16. Accordingly, the first reflective layer 16 that is formed on the surface of the underlayer 14 other than the reflective layer is the lower reflective layer according to the embodiment of the present invention.

In the following description, the upper side in the drawing, that is, the second reflective layer 18 side will also be referred to as "upper side", and the lower side in the drawing, that is, the support 12 side will also be referred to as "lower side".

FIG. 1 is a diagram conceptually showing a state where a cross-section of the reflective sheet 10 is observed with a scanning electron microscope (SEM) (the same shall be applied to FIGS. 2 and 3 below).

Both the first reflective layer 16 and the second reflective layer 18 are cholesteric liquid crystal layers obtained by immobilizing a cholesteric liquid crystalline phase. Accordingly, in the first reflective layer 16 and the second reflective layer 18, a stripe pattern including bright portions B and dark portions D derived from the cholesteric liquid crystalline phase is observed.

<Support>

In the reflective sheet 10, the support 12 supports the underlayer 14, the first reflective layer 16, and the second reflective layer 18.

As the support 12, a well-known sheet-shaped material (film or plate-shaped material) can be used without any particular limitation. Examples of the support or the peelable support include a resin film formed of polyester such as polyethylene terephthalate (PET), polycarbonate (PC), an acrylic resin, an epoxy resin, a polyurethane, a cycloolefin resin, a polyamide, a polyolefin, a cellulose derivative, a silicone, or the like.

The support 12 may be peelable from the underlayer 14. In addition, in a case where the reflective sheet 10 does not include the underlayer 14, the support 12 may be peelable from the first reflective layer 16.

Examples of the peelable support 12 include a resin film formed of a resin film including a cellulose derivative, a cycloolefin resin, or polyethylene terephthalate. In particular, a resin film formed of a resin including polyethylene terephthalate is preferable.

In addition, the peelable support 12 may be provided by providing a well-known peelable layer between the non-peelable support 12 and the underlayer 14. Further, by performing a well-known surface treatment on the surface of the non-peelable support 12, the peelable support 12 may be obtained.

The peelable support 12 may be peeled off from the reflective sheet (underlayer 14), for example, after being bonded to other reflective sheets such as a decorative sheet, various optical devices, or the like, after being bonded to a constituent member of an image display device to manufacture an image display device, or after being bonded to an interior member of an automobile.

The thickness of the support 12 is not particularly limited and may be appropriately set to a value that can exhibit the effect as the support depending on the material for forming the support 12.

The thickness of the support 12 is preferably 20 µm or more and more preferably 40 µm or more. In addition, the thickness of the peelable support 12 is preferably 35 µm or more, more preferably 50 µm or more, and still more preferably 80 µm or more. By adjusting the thickness of the support 12 as the substrate for forming the underlayer 14 and the reflective layer such as the first reflective layer 16 to be 20 µm or more, in particular, adjusting the thickness of the peelable support 12 to be 50 µm or more, a layer having no unevenness can be obtained.

The upper limit of the thickness of the support 12 is not particularly limited, and from the viewpoint of preventing the reflective sheet 10 from being unnecessarily thick, is preferably 1000 µm or less, more preferably 500 µm or less, and still more preferably 300 µm or less.

<Underlayer>

In the reflective sheet 10 shown in the drawing, the underlayer 14 is formed on the support 12.

Examples of the underlayer 14 include a layer functioning as a protective layer that prevents the support 12 from being damaged by a solvent during the formation of the first reflective layer 16 described below and a layer of reducing a difference in surface energy between the formation surface of the first reflective layer 16 and the material (a liquid crystal composition described below) for forming the first reflective layer 16. In addition, in a case where the support 12 is peelable, the underlayer 14 may function as a protective layer for protecting the first reflective layer 16 after bonding the reflective sheet 10 to another member and peeling the support 12.

The material for forming the underlayer 14 is not particularly limited, and various well-known materials can be used depending on the effect required for the underlayer 14. Examples of a material for forming the underlayer 14 include a polyacrylate resin, a polymethacrylate resin, a polyester resin, a polyolefin resin, an epoxy resin, a polyamide resin, and a polyimide resin. Among these, a polyacrylate resin or a polymethacrylate resin is preferable. Examples of the underlayer 14 include an underlayer that is formed by applying an amorphous composition including a (meth)acrylate monomer and curing the applied amorphous composition.

The thickness of the underlayer 14 is not particularly limited and may be appropriately adjusted to a value that can satisfy required properties depending on the material for forming the underlayer 14. The thickness of the underlayer 14 is preferably 0.01 to 8 µm and more preferably 0.05 to 3 µm. In a case where polycarbonate is used as the support 12, component extraction from the support 12 may affect the reflective layer. Accordingly, in a case where polycarbonate is used as the support 12, the thickness of the underlayer 14 is preferably 0.01 to 8 µm and more preferably 2.5 to 6 µm in order to prevent the component extraction from the support 12 from affecting the reflective layer.

In the reflective sheet according to the embodiment of the present invention, the support 12 and the underlayer 14 are provided as a preferable aspect.

Accordingly, the reflective sheet according to the embodiment of the present invention does not need to include either or both of the support 12 and the underlayer 14.

<First Reflective Layer and Second Reflective Layer>

In the reflective sheet 10, the first reflective layer 16 (lower reflective layer) is formed on the surface of the underlayer 14, and the second reflective layer 18 is formed on the surface of the first reflective layer 16.

Both the first reflective layer 16 and the second reflective layer 18 are cholesteric liquid crystal layers obtained by immobilizing a cholesteric liquid crystalline phase. Here, the first reflective layer 16 is formed on the surface of the underlayer 14 other than the second reflective layer 18 as the reflective layer. Accordingly, the first reflective layer 16 is the lower reflective layer according to the embodiment of the present invention.

It is known that the cholesteric liquid crystalline phase exhibits selective reflection properties at a specific wavelength.

A center wavelength of selective reflection (selective reflection center wavelength) $\lambda$ of a general cholesteric liquid crystalline phase depends on a helical pitch P in the cholesteric liquid crystalline phase and complies with a relationship of $\lambda = n \times P$ with an average refractive index n of the cholesteric liquid crystalline phase. Therefore, the selective reflection center wavelength can be adjusted by adjusting the helical pitch.

The selective reflection center wavelength of the cholesteric liquid crystalline phase increases as the helical pitch increases.

The helical pitch refers to one pitch (period of helix) of the helical structure of the cholesteric liquid crystalline phase, in other words, one helical turn. That is, the helical pitch refers to the length in a helical axis direction in which a director of the liquid crystal compound constituting the cholesteric liquid crystalline phase rotates by 360°. For example, in the case of rod-shaped liquid crystal, the director is a major axis direction.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fujifilm Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

In addition, the cholesteric liquid crystalline phase exhibits selective reflection properties with respect to left or right circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

A direction of rotation of the cholesteric liquid crystalline phase can be adjusted by adjusting the kind of the liquid crystal compound that forms the cholesteric liquid crystal layer and/or the kind of the chiral agent to be added.

Here, in the reflective sheet 10 according to the embodiment of the present invention, both the first reflective layer 16 and the second reflective layer 18 as the cholesteric liquid crystal layers have a pitch gradient structure in which a helical pitch changes in a thickness direction. The thickness direction is an up-down direction in FIG. 1.

In the example shown in the drawing, in the first reflective layer 16 and the second reflective layer 18, the helical pitch gradually increases upward. That is, in the first reflective layer 16 and the second reflective layer 18, a selective reflection center wavelength, that is, a wavelength range of light that is selectively reflected gradually increases upward.

In the following description, in the cholesteric liquid crystal layer, the pitch gradient structure in which the helical pitch changes in the thickness direction will also be referred to as "PG structure".

In order to form the cholesteric liquid crystal layer having the PG structure, the chiral agent in which back isomerization, dimerization, isomerization, dimerization or the like occurs during light irradiation such that the helical twisting power (HTP) changes is used. By irradiating the liquid crystal composition with light having a wavelength at the HTP of the chiral agent changes before or during the curing of the liquid crystal composition for forming the cholesteric liquid crystal layer, the cholesteric liquid crystal layer having the PG structure can be formed.

For example, by using a chiral agent in which the HTP decreases during light irradiation, the HTP of the chiral agent decreases during light irradiation.

Here, the irradiated light is absorbed by a material for forming the cholesteric liquid crystal layer. Accordingly, for example, in a case where the light is irradiated from the upper side, the irradiation dose of the light gradually decreases from the upper side to the lower side. That is, the amount of decrease in the HTP of the chiral agent gradually decreases from above to below. Therefore, on the upper side where the decrease in HTP is large, the induction of helix is small, and thus the helical pitch is long. On the lower side where the decrease in HTP is small, helix is induced by the original HTP of the chiral agent, and thus the helical pitch decreases.

That is, in this case, in the cholesteric liquid crystal layer, long-wavelength light is selectively reflected from the upper side, and short-wavelength light is selectively reflected from the lower side as compared to the upper side. Accordingly, by using the cholesteric liquid crystal layer having the PG structure in which the helical pitch changes in the thickness direction, light in a wide wavelength range can be selectively reflected.

In addition, in a cross-section of each of the first reflective layer 16 and the second reflective layer 18 as the cholesteric liquid crystal layer observed with a SEM, a stripe pattern in which bright portions B (bright lines) and dark portions D (dark lines) derived from a cholesteric liquid crystalline phase are alternately laminated in the thickness direction (the up-down direction in FIG. 1) is observed.

Here, in the reflective sheet 10 according to the embodiment of the present invention, in the cross-section of each of the first reflective layer 16 and the second reflective layer 18 observed with a SEM, the bright portions B and the dark portions D have the flapping structure in which at least a part thereof forms periodical flapping unevenness in a plane direction.

That is, in the present invention, the first reflective layer 16 and the second reflective layer 18 have a cholesteric liquid crystal structure in which an angle between the helical axis and the surface of the reflective layer periodically changes. In other words, both the reflective layers have a cholesteric liquid crystal structure, the cholesteric liquid crystal structure provides a stripe pattern including the bright portions B and the dark portions D in a cross-sectional view of the reflective layer that is observed with a SEM, and an angle between a normal line of a line formed by a dark portion and the surface of the reflective layer periodically changes.

It is preferable that the flapping structure is a structure in which at least one region M where an absolute value of an inclination angle of a continuous line of the bright portions B or the dark portions D that form the stripe pattern with respect to a plane of the cholesteric liquid crystal layer (reflective layer) is 5° or more is present, and a peak or valley having an inclination angle of 0° is specified at two positions most adjacent to each other with the region M interposed therebetween in a plane direction.

The peak or valley having an inclination angle of 0° may have a protrusion shape or a recessed shape. However, the peak or valley may be a point having a stepwise shape or a rack shape as long as it has an inclination angle of 0°. In the flapping structure, it is preferable that the region M in which an absolute value of an inclination angle of a continuous line of the bright portions B or the dark portions D in the stripe pattern is 5° or more and the peak or valley in which the region M is interposed are repeated multiple times.

Figure 2:
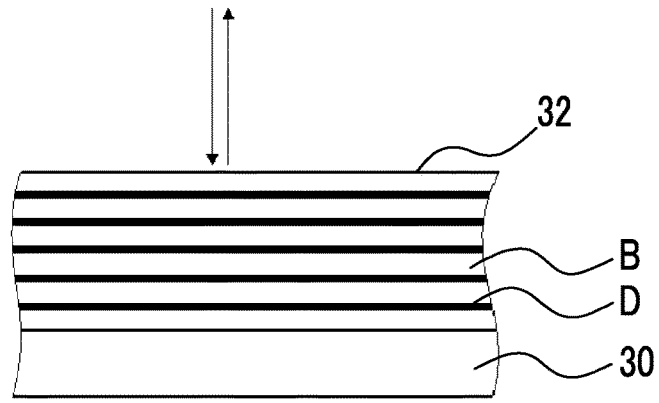
FIG. 2 is a conceptual diagram showing light reflection from a cholesteric liquid crystal layer.

FIG. 2 conceptually shows a cross-section of a layer obtained by immobilizing a general cholesteric liquid crystalline phase.

As described above, as shown in FIG. 2, in a case where a cross-section of a cholesteric liquid crystal layer 32 formed on a substrate 30 is observed with a SEM, the stripe pattern including the bright portions B and the dark portions D is observed. That is, in the cross-section of the cholesteric liquid crystal layer, a layered structure in which the bright portions B and the dark portions D are alternately laminated in the thickness direction is observed.

In the cholesteric liquid crystal layer, a structure in which the bright portion B and the dark portion D are repeated twice corresponds to the helical pitch. Therefore, the helical pitch of the cholesteric liquid crystal layer, that is, the reflective layer can be measured from a SEM cross-sectional view. That is, the structure in which the bright portion B and the dark portion D are repeated twice includes three bright portions and two dark portions.

In the cholesteric liquid crystal layer 32, in general, the stripe pattern (layered structure) including the bright portions B and the dark portions D is formed parallel to the surface of the substrate 30 as shown in FIG. 2. The cholesteric liquid crystal layer 32 exhibits specular reflection properties. That is, in a case where light is incident from the normal direction of the cholesteric liquid crystal layer 32, the light is reflected from the normal direction. The light is not likely to be reflected in the oblique direction, and diffusion reflection properties are poor (refer to arrows in FIG. 2).

Figure 3:
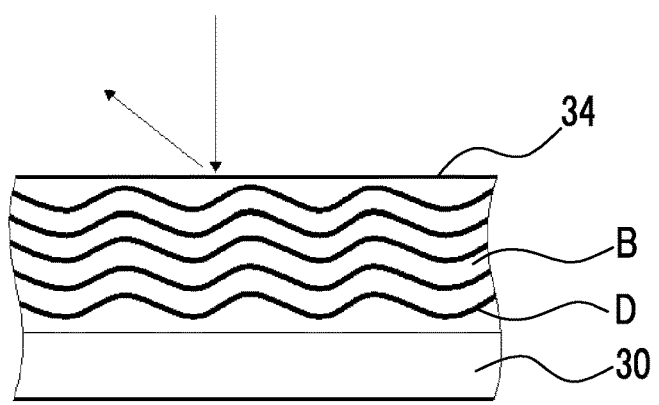
FIG. 3 is a conceptual diagram showing light reflection from a cholesteric liquid crystal layer.

On the other hand, in a case where the bright portions B and the dark portions D have the flapping structure (undulation structure) as in the cholesteric liquid crystal layer 34 of which the cross-section is conceptually shown in FIG. 3 and light is incident from the normal direction of the cholesteric liquid crystal layer 34, a region where the helical axis of the liquid crystal compound is inclined as concep-tually shown in FIG. 3. Therefore, a part of the incidence light is reflected in the oblique direction (refer to arrows in FIG. 3).

That is, in the cholesteric liquid crystal layer obtained by immobilizing a cholesteric liquid crystalline phase, the bright portions B and the dark portions D have the flapping structure. As a result, a reflective layer having high diffusion reflection properties can be realized.

In the reflective sheet 10 according to the embodiment of the present invention, in the cross-section of each of the first reflective layer 16 and the second reflective layer 18 observed with a SEM, the bright portions B and the dark portions D derived from a cholesteric liquid crystalline phase have the flapping structure.

In the following description, the configuration in which the bright portions B and the dark portions D derived from a cholesteric liquid crystalline phase have the flapping structure in the cross-section of the cholesteric liquid crystal layer (reflective layer) observed with a SEM will also be simply referred to as "the cholesteric liquid crystal layer (reflective layer) has the flapping structure".

The cholesteric liquid crystal layer having the flapping structure can be formed by forming the cholesteric liquid crystal layer on a formation surface on which an alignment treatment such as rubbing is not performed. Accordingly, in the example shown in the drawing, the first reflective layer having the flapping structure can be formed by forming the first reflective layer 16 on the underlayer 14 on which the alignment treatment such as the rubbing treatment is not performed.

That is, in a case where the first reflective layer 16 as the cholesteric liquid crystal layer is formed on the underlayer 14 on which the alignment treatment is not performed, there is no horizontal alignment restriction force with respect to the liquid crystal compound, and thus the alignment direction of the liquid crystal compound on the surface of the underlayer 14 varies depending on physical properties of the underlayer 14. In a case where the first reflective layer 16 is formed in this state, the helical axis of the liquid crystal compound forming the cholesteric liquid crystalline phase faces various directions. As a result, in the first reflective layer 16, the stripe pattern including the bright portions B and the dark portions D have the flapping structure.

In addition, in a case where the cholesteric liquid crystal layer is formed on the cholesteric liquid crystal layer, the upper cholesteric liquid crystal layer follows the alignment state of the surface of the lower cholesteric liquid crystal layer. In other words, in a case where the cholesteric liquid crystal layer is formed on the cholesteric liquid crystal layer, the alignment state of the upper cholesteric liquid crystal layer follows the alignment state of the surface of the lower cholesteric liquid crystal layer.

Accordingly, in a case where the second reflective layer 18 as the cholesteric liquid crystal layer is formed on the first reflective layer 16 having the flapping structure, the second reflective layer 18 follows the alignment state of the surface of the first reflective layer 16 such that the second reflective layer 18 is also formed as the cholesteric liquid crystal layer having the same flapping structure as that of the first reflective layer 16. Therefore, in the reflective sheet 10, the first reflective layer 16 and the second reflective layer 18 have the same flapping structure in which the periods of undulation, that is, the unevenness shapes of the flapping structure substantially match each other.

The amplitudes of undulation (the heights of undulation (unevenness)) in the first reflective layer 16 and the second reflective layer 18 may be the same as or different from each other.

Here, in a case where a general chiral agent is irradiated with light, the HTP thereof decreases. In addition, light for changing the HTP of the chiral agent is typically emitted from the side opposite to the support 12. In particular, in order to prevent the second reflective layer 18 and further the reflective layer formed after the second reflective layer 18 from being affected by the previously formed reflective layer (cholesteric liquid crystal layer), it is preferable that light for changing the HTP of the chiral agent is emitted from the side opposite to the support 12.

In addition, in the first reflective layer 16 and the second reflective layer 18, the amplitudes of undulation may be the same as or different from each other, and a region having the same amplitude of undulation and a region having different amplitudes of undulation may be mixed.

In the reflective sheet 10 according to the embodiment of the present invention, the bright portions B and the dark portions D of the first reflective layer 16 and the second reflective layer 18 are not limited to a configuration in which the entire area of all the bright portions B and the dark portions D have the flapping structure, and at least a part of the bright portions B and the dark portions D only needs to have the flapping structure.

That is, in the reflective sheet 10 according to the embodiment of the present invention, the bright portions B and the dark portions D in the first reflective layer 16 and the second reflective layer 18 may include a region not having the flapping structure due to the formation of a defect portion or the like.

The reflective sheet according to the embodiment of the present invention includes a plurality of reflective layers (cholesteric liquid crystal layers) having the flapping structure, at least one of the reflective layers has the PG structure in which the helical pitch changes in the thickness direction, and further the thickness of the lower reflective layer that is formed on a surface other than the surface of the reflective layer is less than that of another reflective layer that is formed on the surface of the reflective layer. In the example shown in the drawing, the reflective sheet 10 includes two reflective layers including the first reflective layer 16 and the second reflective layer 18. In a preferable aspect, the two reflective layers have the PG structure, and the thickness of the first reflective layer 16 as the lower reflective layer is less than that of the second reflective layer 18. In the example shown in the drawing, the second reflective layer 18 is the outermost layer.

The reflective sheet 10 according to the embodiment of the present invention has the above-described configuration. As a result, a reflective sheet that can reflect light in a wide wavelength range with excellent diffusibility and has excellent properties such as inconspicuous color unevenness, light amount unevenness, and the like caused by defects of the reflective layer (cholesteric liquid crystal layer) can be realized.

As described above, in the reflective sheet in which the cholesteric liquid crystal layer is used as the reflective layer, in order to obtain excellent diffusion reflection properties, it is preferable that, in the cross-section of the cholesteric liquid crystal layer observed with a SEM, the bright portions B and the dark portions D derived from a cholesteric liquid crystalline phase have the flapping structure. In addition, in the reflective sheet in which the cholesteric liquid crystal layer is used as the reflective layer, in order to widen the selective reflection wavelength range, it is preferable that the PG structure in which the helical pitch changes in the thickness direction of the cholesteric liquid crystal layer is provided.

Here, as described above, the PG structure can be obtained by using a chiral agent of which the HTP changes by light irradiation and irradiating the chiral agent with light having a wavelength that is absorbed by the chiral agent during the formation of the cholesteric liquid crystal layer such that the irradiation dose of light in the thickness direction, that is, the amount of change in HTP changes. Accordingly, as a difference in the irradiation dose of the light during the formation of the cholesteric liquid crystal layer increases in the thickness direction, the selective reflection wavelength range can be widened.

According to an investigation by the present inventors, in the reflective sheet in which the cholesteric liquid crystal layer having the flapping structure and the PG structure is used as the reflective layer, as the thickness of the cholesteric liquid crystal layer increases, defects in the flapping structure of the cholesteric liquid crystal layer are conspicuous such that color unevenness and unevenness in the amount of light reflected occur.

As described above, the cholesteric liquid crystal layer having the flapping structure is obtained by forming the cholesteric liquid crystal layer on a surface on which the alignment treatment is not performed. That is, the cholesteric liquid crystal layer having the flapping structure is formed in a state where there is no horizontal alignment restriction force with respect to the liquid crystal compound. Therefore, defect portions such as a fractured portion, a branched portion, an extremely bent portion or a folded portion may be formed in at least a part of the bright portions B and the dark portions D of the cholesteric liquid crystal layer.

On the other hand, the PG structure is the structure in which the helical pitch of the cholesteric liquid crystalline phase changes. Therefore, in the cholesteric liquid crystal layer of the PG structure, in a case where defects are present in the cholesteric liquid crystal layer, the change of the helical pitch are amplified, and defects are conspicuous. The amplification effect of the defects increases as the thickness of the cholesteric liquid crystal layer increases.

Therefore, in the reflective sheet in which the cholesteric liquid crystal layer having the flapping structure and the PG structure and having a thickness to some extent is used as the reflective layer, in a case where defects are present in the reflective layer, the defects are more conspicuous than a typical cholesteric liquid crystal layer, and color unevenness and unevenness in the amount of light reflected such as an annual ring occur.

On the other hand, the reflective sheet 10 according to the embodiment of the present invention includes the first reflective layer 16 and the second reflective layer 18 having the flapping structure and the PG structure, and the thickness of the first reflective layer 16 is less than that of the second reflective layer 18.

As described above, the first reflective layer 16 is formed on the underlayer 14 having no alignment restriction force, and thus defects are likely to occur. However, the first reflective layer 16 is aligned to have the flapping structure and have an alignment restriction force to some extent on the surface.

In addition, as described above, the second reflective layer 18 follows the alignment state of the surface of the first reflective layer 16. Here, the first reflective layer 16 is aligned to have the flapping structure and has an alignment restriction force on the surface. As a result, the second reflective layer 18 formed on the first reflective layer 16 has the same effect as that in a case where it is formed on the surface on which the alignment treatment is performed. Therefore, although the second reflective layer 18 has the flapping structure, the occurrence of defects can be significantly suppressed. Accordingly, even in a case where the thickness of the second reflective layer 18 is large, defects are inconspicuous.

Further, the thickness of the first reflective layer 16 having a large amount of defects is less than that of the second reflective layer 18. Therefore, even in a case where the first reflective layer 16 has the PG structure, the amplification effect of defects is small, and defects can be made inconspicuous.

Accordingly, according to the present invention, in the reflective sheet in which the cholesteric liquid crystal layer having the flapping structure and the PG structure is used as the reflective layer, the second reflective layer 18 can be made thick, and a reflective sheet having a wide selective reflection wavelength range, excellent diffusion reflection properties, and excellent properties such as inconspicuous defects can be realized.

In the reflective sheet 10 in the example shown in the drawing, the first reflective layer 16 and the second reflective layer 18 have the PG structure, but the present invention is not limited thereto.

That is, in the reflective sheet according to the embodiment of the present invention, the first reflective layer 16 may have the PG structure, and the second reflective layer 18 may have a structure in which the helical pitch is uniform. Alternatively, the first reflective layer 16 may have a structure in which the helical pitch is uniform, and the second reflective layer 18 may have the PG structure.

However, in the reflective sheet according to the embodiment of the present invention, it is preferable that at least the second reflective layer 18 has the PG structure, and it is more preferable that both the first reflective layer 16 and the second reflective layer 18 have the PG structure as in the example shown in the drawing.

This point is also applicable to a case where three or more reflective layers are provided. That is, in the reflective sheet according to the embodiment of the present invention at least one of a plurality of reflective layers only needs to have the PG structure. However, in the reflective sheet according to the embodiment of the present invention, it is preferable that at least one reflective layer other than the first reflective layer 16 (lower reflective layer) have the PG structure, it is more preferable that a plurality of reflective layers other than the first reflective layer 16 have the PG structure, and it is still more preferable that all the reflective layers other than the first reflective layer 16 have the PG structure. In this case, the first reflective layer 16 does not need to have the PG structure but preferably has the PG structure.

The thickness of the first reflective layer 16 is not particularly limited as long as it is less than that of the second reflective layer 18 (the other reflective layer).

The thickness of the first reflective layer 16 is preferably 3.5 µm or less, more preferably 3.2 µm or less, and still more preferably 2.7 µm or less.

By adjusting the thickness of the first reflective layer 16 to be 3.5 µm or less, the alignment restriction force can be transmitted in the thickness direction due to self-organization of the cholesteric liquid crystalline phase, which is preferable from the viewpoint that defects of the cholesteric liquid crystal layer can be made to be more inconspicuous.

From the viewpoint that, for example, a sufficient alignment restriction force can be exhibited to the second reflective layer 18, the thickness of the first reflective layer 16 is preferably 0.3 µm or more.

The thickness of the second reflective layer 18 (the reflective layer other than the first reflective layer 16) is not particularly limited as long as it is more than that of the first reflective layer 16.

The thickness of the second reflective layer 18 is preferably 4 µm or more, more preferably 5 µm or more, and still more preferably 6 µm or more.

By adjusting the thickness of the second reflective layer 18 to be 4 µm or more, light in a wider wavelength range can be selectively reflected, which is preferable from the viewpoint that a higher reflectivity can be obtained.

From the viewpoint of preventing the reflective sheet 10 from being unnecessarily thick, the thickness of the second reflective layer 18 is preferably 7 µm or less.

A difference in thickness between the first reflective layer 16 and the second reflective layer 18 is not particularly limited and is preferably 1 µm or more, more preferably 2 µm or more, and still more preferably 2.5 µm or more.

It is preferable that the thickness of the second reflective layer 18 is more than that of the first reflective layer 16 by 1 µm or more from the viewpoint that, for example, light in a wider wavelength range can be selectively reflected and defects of the cholesteric liquid crystal layer can be made more inconspicuous.

In the first reflective layer 16 and the second reflective layer 18, the inter-peak distance and the amplitude (the height of undulation) of the flapping structure are also not particularly limited.

Here, in the cholesteric liquid crystal layer having the flapping structure, as the inter-peak distance decreases, higher diffusion reflection properties is exhibited. In addition, as the amplitude increases, higher diffusion reflection properties are exhibited.

From the viewpoints of forming the flapping structure having a small amount of defects and obtaining higher diffusion reflection properties, the average value of inter-peak distances in the flapping structure of the first reflective layer 16 is preferably 0.5 to 50 µm, more preferably 1.5 to 20 µm, and still more preferably 2.5 to 10 µm.

As described above, the second reflective layer 18 follows the flapping structure of the first reflective layer 16. Therefore, the average value of the inter-peak distances of the second reflective layer 18 is substantially the same as the first reflective layer 16.

Figure 4:
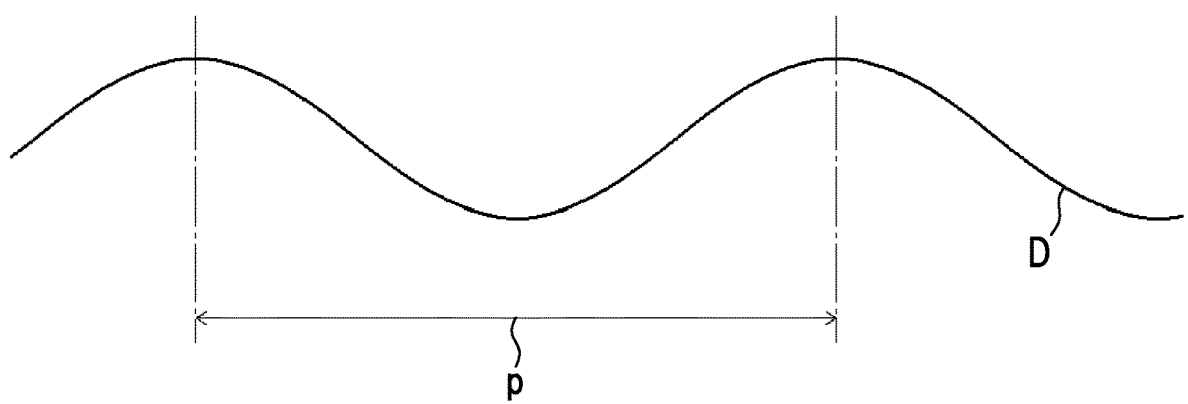
FIG. 4 is a conceptual diagram showing an inter-peak distance of a flapping structure.

The inter-peak distance of the flapping structure refers to a distance p between peaks of convex portions most adjacent to each other in the flapping structure as conceptually shown in FIG. 4.

Specifically, the average value of the inter-peak distances is measured as follows. First, the distance in the plane direction of the cholesteric liquid crystal layer between peaks (or valleys) having an inclination angle of 0° at two positions that are most adjacent to each other with respect to a region M where the absolute value of an inclination angle with respect to a plane of the cholesteric liquid crystal layer is 5° or more is measured. By performing this measurement is performed on the length of 100 µm of the cholesteric liquid crystal layer in the cross-sectional major axis direction, the arithmetic mean value of all the thicknesses is obtained as the average value of the inter-peak distances.

In the reflective sheet 10 according to the embodiment of the present invention, a wavelength range of light that is selectively reflected from the first reflective layer 16 and a wavelength range of light that is selectively reflected from the second reflective layer 18 are not particularly limited and may be appropriately adjusted depending on, for example, the use of the reflective sheet.

Accordingly, the wavelength range of light that is selectively reflected from the first reflective layer 16 and the wavelength range of light that is selectively reflected from the second reflective layer 18 may be the same as or different from each other. In a case where the reflection wavelength ranges of the first reflective layer 16 and the second reflective layer 18 are different from each other, the first reflective layer 16 and the second reflective layer 18 may have an overlapping wavelength range or may not have an overlapping wavelength range.

In addition, turning directions of circularly polarized light reflected from the first reflective layer 16 and circularly polarized light reflected from the second reflective layer 18 may be the same as or different from each other.

The above-described points are also applicable to the respective reflective layers in a case where three or more reflective layers are provided.

As described above, the reflective sheet according to the embodiment of the present invention includes three or more reflective layers. Turning directions of circularly polarized light reflected from the respective reflective layers may be the same as or different from each other. Here, in the reflective sheet according to the embodiment of the present invention where at least one reflective layer has the PG structure, selective reflection corresponding to a wide wavelength range can be performed with one reflective layer. Therefore, it is not necessary to increase the number of reflective layers, and the number of reflective layers is preferably two. In a preferable example, a reflective sheet includes two reflective layers in which turning directions of circularly polarized light to be reflected are different from each other.

The absorbances of the first reflective layer 16 and the second reflective layer 18 are not particularly limited.

Here, it is preferable that an absorbance of at least one of the first reflective layer 16 or the second reflective layer 18 with respect to light in a wavelength range of a maximum absorption wavelength of a chiral agent to be included ±10 nm is at least 3.2. For example, it is preferable that the absorbance of at least one of the first reflective layer 16 or the second reflective layer 18 with respect to light having a wavelength of 313 nm is 3.2 or higher.

By adjusting the absorbance of at least one of the first reflective layer 16 or the second reflective layer 18 with respect to light in a wavelength range of a maximum absorption wavelength of a chiral agent to be included ±10 nm to be 3.2 or higher, as the amount of isomerized light permeated into the reflective layer increases, the amount of light is attenuated, and an isomerized light amount distribution can be formed in the thickness direction, which is preferable from the viewpoint that an excellent PG structure can be formed.

In addition, in the reflective sheet 10 shown in FIG. 1, in the PG structures of both the first reflective layer 16 and the second reflective layer 18, the helical pitch gradually increases upward, but the present invention is not limited thereto.

That is, in the reflective sheet according to the embodiment of the present invention, in the PG structures of both the first reflective layer 16 and the second reflective layer 18, the helical pitch gradually may increase downward. That is, in the reflective sheet according to the embodiment of the present invention, the helical pitch of the PG structure may gradually increase toward the surface where the first reflective layer 16 (lower reflective layer) is formed.

Alternatively, directions of the first reflective layer 16 and the second reflective layer 18 in which the helical pitch gradually increases may be different from each other such that the helical pitch of the PG structure of the first reflective layer 16 gradually increases upward and the helical pitch of the PG structure of the second reflective layer 18 gradually increases downward.

The above-described points are also applicable to the respective reflective layers in a case where three or more reflective layers are provided.

Regarding the reflective sheet 10 according to the embodiment of the present invention, in order to form the reflective sheet (cholesteric liquid crystal layer), light irradiation for curing the reflective layer may be performed after performing light irradiation for changing the HTP of the chiral agent. Alternatively, light irradiation for changing the HTP of the chiral agent and light irradiation for curing the reflective layer may be performed at the same time.

The HTP of the chiral agent is likely to decrease by light irradiation. Therefore, it is preferable that the helical pitch in the thickness direction of each of the reflective layers in the reflective sheet according to the embodiment of the present invention is long on the side where the curing rate is high and is short on the side where the curing rate is low.

In the reflective sheet 10 according to the embodiment of the present invention, an integral reflectivity I-R($\lambda$) at a wavelength and a specular reflectivity S-R($\lambda$) at the wavelength $\lambda$ are not particularly limited.

In the reflective sheet 10 according to the embodiment of the present invention, the integral reflectivity I-R($\lambda$) at the wavelength $\lambda$, is preferably 2 times or more, more preferably 2.5 times or more, and still more preferably 3 times or more with respect to the specular reflectivity S-R($\lambda$) at the wavelength $\lambda$.

It is preferable that the integral reflectivity I-R($\lambda$) at the wavelength $\lambda$, to be 2 times or more with respect to the specular reflectivity S-R($\lambda$) at the wavelength $\lambda$, from the viewpoint that higher diffusion reflection properties can be obtained.

In addition, in the reflective sheet 10 according to the embodiment of the present invention, a half-width of a reflection spectrum in a wavelength range where light is selectively reflected is not particularly limited.

From the viewpoint that, for example, light in a wider wavelength range can be reflected, the half-width in the integral reflection spectrum is preferably 100 nm or longer, more preferably 125 nm or longer, and still more preferably 150 nm or longer.

[Liquid Crystal Composition]

The first reflective layer 16 and the second reflective layer 18, that is, the cholesteric liquid crystal layers can be formed using a liquid crystal composition including a liquid crystal compound and a chiral agent.

(Liquid Crystal Compound)

It is preferable that the liquid crystal compound used for forming the cholesteric liquid crystal layer has two or more polymerizable groups. That is, a polymerizable liquid crystal compound is preferable. In addition, an average molar absorption coefficient in 300 to 400 nm is preferably lower than 5000.

The liquid crystal compound may be a rod-shaped liquid crystal compound or a disk-shaped liquid crystal compound and is preferably a rod-shaped liquid crystal compound.

Examples of the rod-shaped liquid crystal compound for forming a cholesteric liquid crystal structure include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the liquid crystal compound is preferably 1 to 6 and more preferably 1 to 3 in one molecule.

Examples of the liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO1995/022586, WO1995/024455, WO1997/000600, WO1998/023580, WO1998/052905, WO2016/194327A, WO2016/052367A, JP1989-272551A (JP-H1-272551A), JP1994-16616A (JP-H6-16616A), JP1995-110469A (JP-H7-110469A), JP1999-80081A (JP-H11-80081A), and JP2001-328973A.

In the liquid crystal composition, that is, the cholesteric liquid crystal layer, two or more liquid crystal compounds may be used in combination. In a case where two or more liquid crystal compounds are used in combination, there may be a case where the alignment temperature can be decreased.

In addition, the addition amount of the liquid crystal compound in the liquid crystal composition is not particularly limited and is preferably 80 to 99.9 mass %, more preferably 85 to 99.5 mass %, and still more preferably 90 to 99 mass % with respect to the solid content mass (mass excluding a solvent) of the liquid crystal composition.

(Chiral Agent: Optically Active Compound)

As the chiral agent used for forming the cholesteric liquid crystal layer, any well-known chiral agents can be used as long as the HTP thereof changes by light irradiation. A chiral agent having a molar absorption coefficient of 30000 or higher at a wavelength of 313 nm is preferably used.

The chiral agent has a function of causing a helical structure of a cholesteric liquid crystalline phase to be formed. The chiral compound may be selected depending on the purpose because a helical sense or a helical pitch induced from the compound varies.

As the chiral agent, a well-known compound can be used, but a compound having a cinnamoyl group is preferable. Examples of the chiral agent include compounds described in Liquid Crystal Device Handbook (No. 142 Committee of Japan Society for the Promotion of Science, 1989), Chapter 3, Article 4-3, chiral agent for TN or STN, p. 199), JP2003-287623A, JP2002-302487A, JP2002-080478A, JP2002-080851A, JP2010-181852A, and JP2014-034581A.

In general, the chiral agent includes an asymmetric carbon atom. However, an axially asymmetric compound or a planar asymmetric compound not having an asymmetric carbon atom can be used as the chiral agent. Examples of the axially asymmetric compound or the planar asymmetric compound include binaphthyl, helicene, paracyclophane, and derivatives thereof. The chiral agent may include a polymerizable group.

In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

As the chiral agent, an isosorbide derivative, an isomannide derivative, or a binaphthyl derivative can be preferably used. As the isosorbide derivative, a commercially available product such as LC-756 (manufactured by BASF SE) may be used.

The content of the chiral agent in the liquid crystal composition is preferably 0.01 to 200 mol % and more preferably 1 to 30 mol % with respect to the amount of the liquid crystal compound.

(Polymerization Initiator)

It is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), an acylphosphine oxide compound (described in JP1988-040799B (JP-S63-040799B), JP1993-29234B (JP-H5-29234B), JP1998-95788A (JP-H10-95788A), JP1998-029997A (JP-H10-029997A), JP2001-233842A, JP2000-80068A, JP2006-342166A, JP2013-114249A, JP2014-137466A, JP4223071B, JP2010-262028A, and JP2014-500852A), an oxime compound (described in JP2000-066385A and Japanese Patent No. 4454067), and an oxadiazole compound (described in U.S. Pat. No. 4,212,970A). The details of the polymerization initiator can also be found in, for example, the description of paragraphs "0500" to "0547" of JP2012-208494A.

Examples of the polymerization initiator that can be used include an acylphosphine oxide compound and an oxime compound.

As the acylphosphine oxide compound, for example, IRGACURE 810 (manufactured by BASF SE, compound name: bis(2,4,6-trimethylbenzoyl)-phenylphosphine oxide) as a commercially available product can be used. As the oxime compound, for example, a commercially available product such as IRGACURE OXE01 (manufactured by BASF SE), IRGACURE OXE02 (manufactured by BASF SE), TR-PBG-304 (manufactured by Changzhou Tronly New Electronic Materials Co., Ltd.), ADEKA ARKLS NCI-831 and ADEKA ARKLS NCI-930 (manufactured by Adeka Corporation), ADEKA ARKLS NCI-831 (manufactured by Adeka Corporation) can be used.

As the polymerization initiator, one kind may be used alone, or two or more kinds may be used in combination.

In a case where light irradiation for curing the reflective layer (cholesteric liquid crystal layer) is performed to form the reflective layer after performing light irradiation for changing the HTP of the chiral agent, it is preferable to use a photopolymerization initiator that inhibits polymerization during the light irradiation for changing the HTP of the chiral agent. In this case, the content of the photopolymerization initiator in the liquid crystal composition is preferably 0.05 to 3 mass % and more preferably 0.3 to 1.5 mass % with respect to the content of the liquid crystal compound. In addition, the light irradiation for changing the HTP of the chiral agent and the light irradiation for curing the reflective layer are performed at the same time, the content of the photopolymerization initiator in the liquid crystal composition is preferably 0.01 to 0.3 mass % and more preferably 0.01 to 0.2 mass % with respect to the content of the liquid crystal compound.

(Crosslinking Agent)

In order to improve the film hardness after curing and to improve durability, the liquid crystal composition may optionally include a crosslinking agent. As the crosslinking agent, a crosslinking agent which can perform curing with ultraviolet light, heat, moisture, or the like can be preferably used.

The kind of the crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl) propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane.

In addition, depending on the reactivity of the crosslinking agent, a well-known catalyst can be used, and not only film hardness and durability but also productivity can be improved. As the catalyst, one kind may be used alone, or two or more kinds may be used in combination.

The content of the crosslinking agent in the liquid crystal composition is preferably 3 to 20 mass % and more preferably 5 to 15 mass % with respect to the solid content of the liquid crystal composition.

(Alignment Controller)

An alignment controller contributing to the stable or rapid formation of a cholesteric liquid crystal structure with planar alignment may be added to the liquid crystal composition.

Examples of the alignment controller include fluorine (meth)acrylate polymers described in paragraphs "0018" to "0043" of JP2007-272185A, and compounds represented by Formulae (I) to (IV) described in paragraphs "0031" to "0034" of JP2012-203237A.

As the alignment controller, one kind may be used alone, or two or more kinds may be used in combination.

The addition amount of the alignment controller in the liquid crystal composition is preferably 0.01 to 10 mass %, more preferably 0.01 to 5 mass %, and still more preferably 0.02 to 1 mass % with respect to the total mass of the liquid crystal compound.

(Surfactant)

The liquid crystal composition may include a surfactant.

It is preferable that the surfactant is a compound which can function as an alignment controller contributing to the stable or rapid formation of a cholesteric structure with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As a horizontal alignment agent, one kind may be used alone, or two or more kinds may be used in combination.

As the fluorine surfactant, a compound represented by the following Formula (I) described in paragraphs "0082" to "0090" of JP2014-119605A is preferable.

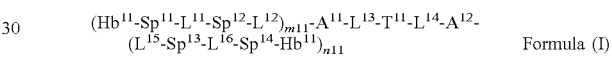

Formula (I)

In Formula (I), $L^{11}$, $L^{12}$, $L^{13}$, $L^{14}$, $L'^{5}$, and $L^{16}$ each independently represent a single bond, —O—, —S—, —CO—, —COO—, —OCO—, —COS—, —SCO—, —NRCO—, or —CONR— (in Formula (I), R represents a hydrogen atom or an alkyl group having 1 to 6 carbon atoms). —NRCO— or —CONR— has an effect of reducing solubility and is likely to increase haze during the preparation of dots. Therefore, —O—, —S—, —CO—, —COO—, —OCO—, —COS— or —SCO— is preferable, and from the viewpoint of the stability of the compound, —O—, —CO—, —COO—, or —OCO— is more preferable. An alkyl group represented by R may be linear or branched. An alkyl group having 1 to 3 carbon atoms is more preferable, and examples thereof include a methyl group, an ethyl group, and an n-propyl group.

$Sp^{11}$, $Sp^{12}$, $Sp^{13}$, and $Sp^{14}$ each independently represent a single bond or an alkylene group having 1 to 10 carbon atoms, more preferably a single bond or an alkylene group having 1 to 7 carbon atoms, and still more preferably a single bond or an alkylene group having 1 to 4 carbon atoms. However, a hydrogen atom in the alkylene group may be substituted with a fluorine atom. The alkylene group may have a branch or not, and a linear alkylene group having no branch is preferable. From the viewpoint of synthesis, it is preferable that $Sp^{11}$ and $Sp^{14}$ are the same and $Sp^{12}$ and $Sp^{13}$ are the same.

$A^{11}$ and $A^{12}$ represent a monovalent to tetravalent aromatic hydrocarbon group. The number of carbon atoms in the aromatic hydrocarbon group is preferably 6 to 22, more preferably 6 to 14, still more preferably 6 to 10, and still more preferably 6. The aromatic hydrocarbon group represented by $A^{11}$ and $A^{12}$ may have a substituent. Examples of the substituent include an alkyl group having 1 to 8 carbon atoms, an alkoxy group, a halogen atom, a cyano group, and an ester group. The description and preferable ranges of the groups can be found in the corresponding description of $T^{11}$ described below. Examples of a substituent with which the aromatic hydrocarbon group represented by $A^{11}$ or $A^{12}$ is substituted include a methyl group, an ethyl group, a methoxy group, an ethoxy group, a bromine atom, a chlorine atom, and a cyano group. A molecule including a large amount of a perfluoroalkyl portion can cause liquid crystal to be aligned even in a small addition amount, which leads to reduction in haze. Therefore, in order for the molecule to include many perfluoroalkyl groups, it is preferable that $A^{11}$ and $A^{12}$ are tetravalent. From the viewpoint of synthesis, it is preferable that $A^{11}$ and $A^{12}$ are the same.

$T^{11}$ represents a divalent group or a divalent aromatic heterocyclic group preferably represented by any one of the following formulae (X in $T^{11}$ represents an alkyl group having 1 to 8 carbon atoms, an alkoxy group, a halogen atom, a cyano group, or an ester group, and Ya, Yb, Yc, and Yd each independently represent a hydrogen atom or an alkyl group having 1 to 4 carbon atoms).

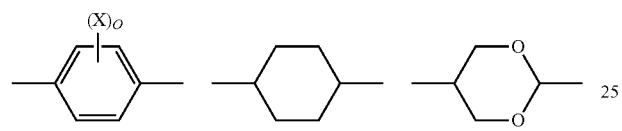

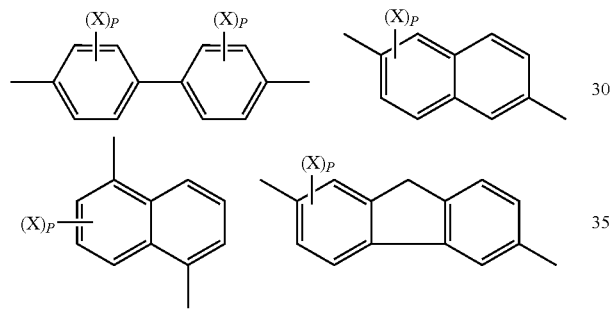

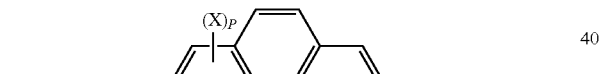

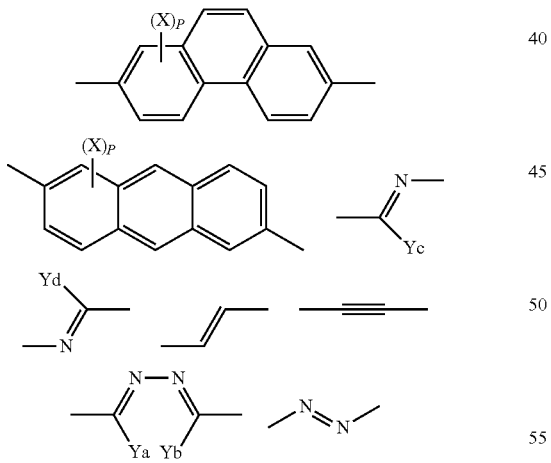

In particular, a more preferable group is as follows.

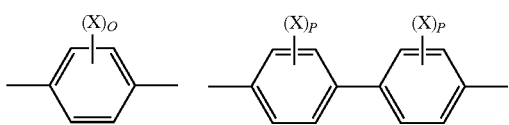

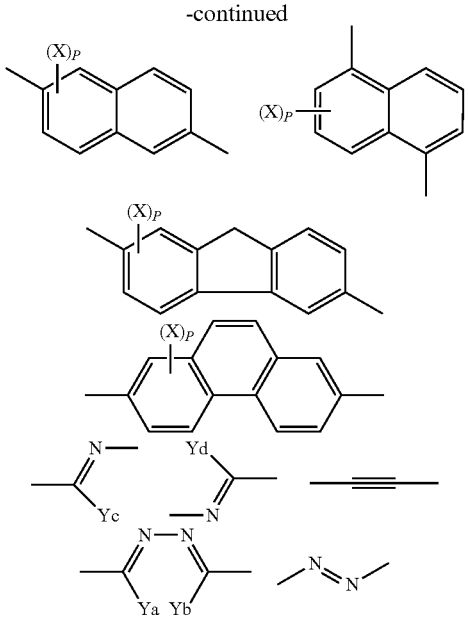

The following group is still more preferable.

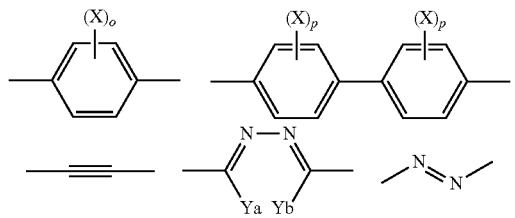

The following group is most preferable.

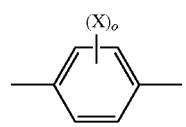

The number of carbon atoms in the alkyl group represented by X in $T^{11}$ is 1 to 8, preferably 1 to 5, and more preferably 1 to 3. The alkyl group may be linear, branched, or cyclic and is preferably linear or branched. Preferable examples of the alkyl group include a methyl group, an ethyl group, an n-propyl group, and an isopropyl group. Among these, a methyl group is preferable.

The details of an alkyl portion of the alkoxy group represented by X in $T^{11}$ can be found in the description and preferable range of the alkyl group represented by X in $T^{11}$. Examples of the halogen atom represented by X in $T^{11}$ include a fluorine atom, a chlorine atom, a bromine atom, and an iodine atom. Among these, a chlorine atom or a bromine atom is preferable. Examples of the ester group represented by X in $T^{11}$ include a group represented by $R^aCOO-$. $R_a$ represents, for example, an alkyl group having 1 to 8 carbon atoms. The description and preferable range of the alkyl group represented by $R^a$ can be found in the description and preferable range of the alkyl group represented by X in $T^{11}$. Specific examples of the ester include $CH_3COO-$ and $C_2H_5COO-$. The alkyl group having 1 to 4 carbon atoms represented by Ya, Yb, Yc, and Yd may be linear or branched. Examples of the alkyl group having 1 to 4 carbon atoms include a methyl group, an ethyl group, an n-propyl group, and an isopropyl group.

It is preferable that the divalent aromatic heterocyclic group has a 5-membered, 6-membered, or 7-membered heterocycle. A 5- or 6-membered ring is more preferable, and a 6-membered ring is most preferable. As a heteroatom constituting the heterocycle, a nitrogen atom, an oxygen atom, or a sulfur atom is preferable. It is preferable that the heterocycle is an aromatic heterocycle. In general, the aromatic heterocycle is an unsaturated heterocycle. An unsaturated heterocycle having most double bonds is more preferable. Examples of the heterocycle include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring. The divalent heterocyclic group may have a substituent. The description and preferable range of the substituent can be found in the description of the substituent with which the monovalent to tetravalent aromatic hydrocarbon represented by $A^{11}$ or $A^{12}$ is substituted.

$Hb^{11}$ represents a perfluoroalkyl group having 2 to 30 carbon atoms, more preferably a perfluoroalkyl group having 3 to 20 carbon atoms, and still more preferably a perfluoroalkyl group having 3 to 10 carbon atoms. The perfluoroalkyl group may be linear, branched, or cyclic and is preferably linear or branched and more preferably linear.

m11 and n11 each independently represent 0 to 3 and m11+n11≥1. In this case, a plurality of structures in parentheses may be the same as or different from each other and is preferably the same as each other. m11 and n11 in Formula (I) are determined depending on the valences of $A^{11}$ and $A^{12}$, and preferable ranges thereof are determined depending on the preferable ranges of the valences of $A^{11}$ and $A^{12}$.

o and p in $T^{11}$ each independently represent an integer of 0 or more. In a case where o and p represent an integer of 2 or more, a plurality of X's may be the same as or different from each other. o in $T^{11}$ represents preferably 1 or 2. p in $T^{11}$ represents preferably an integer of 1 to 4 and more preferably 1 to 2.

A molecular structure of the compound represented by Formula (I) may be symmetrical or non-symmetrical. "Symmetry" described herein represents at least one of point symmetry, line symmetry, or rotational symmetry, and "non-symmetry" described herein does not represent any one of point symmetry, line symmetry, or rotational symmetry.

The compound represented by Formula (I) is a combination of the perfluoroalkyl group ($Hb^{11}$), the linking groups -(-$Sp^{11}$-$L^{11}$-$Sp^{12}$-$L^{12}$)m11-$A^{11}$-$L^{13}$- and -$L^{14}$-$A^{12}$-($L^{15}$-$Sp^{13}$-$L^{16}$-$Sp^{14}$)n11, and preferably the divalent group having an excluded volume effect which is represented by $T^{11}$. Two perfluoroalkyl groups ($Hb^{11}$) present in the molecule are preferably the same as each other, and the linking groups -(-$Sp^{11}$-$L^{11}$-$Sp^{12}$-$L^{12}$)m11-$A^{11}$-$L^{13}$- and -$L^{14}$-$A^{12}$-($L^{15}$-$Sp^{13}$-$L^{16}$-$Sp^{14}$)n11- present in the molecule are also preferably the same as each other. $Hb^{11}$-$Sp^{11}$-$L^{11}$-$Sp^{12}$- and -$Sp^{13}$-$L^{16}$-$Sp^{14}$-$Hb^{11}$ present at the terminal are preferably a group represented by any one of the following formulae.

$(C_aF_{2a+1})-(C_bH_{2b})-$, $(C_aF_{2a+1})-(C_bH_{2b})-O-(C_rH_{2r})-$, $(C_aF_{2a+1})-(C_bH_{2b})-COO-(C_rH_{2r})-$, and $(C_aF_{2a+1})-(C_bH_{2b})-OCO-(C_rH_{2r})-$.

In the above formulae, a represents preferably 2 to 30, more preferably 3 to 20, and still more preferably 3 to 10. b represents preferably 0 to 20, more preferably 0 to 10, and still more preferably 0 to 5. a+b represents 3 to 30. r represents preferably 1 to 10 and more preferably 1 to 4.

In addition, $Hb^{11}$-$Sp^{11}$-$L^{11}$-$Sp^{12}L^{12}$- and -$L^{15}$-$Sp^{13}$-$L^{16}$-$Sp^{14}$-$Hb^{11}$ present at the terminal of Formula (I) are preferably a group represented by any one of the following formulae.

$(C_aF_{2a+1})-(C_bH_{2b})-O-$, $(C_aF_{2a+1})-(C_bH_{2b})-COO-$, $(C_aF_{2a+1})-(C_bH_{2b})-O-(C_rH_{2r})-O-$, $(C_aF_{2a+1})-(C_bH_{2b})-COO-(C_rH_{2r})-COO-$, and $(C_aF_{2a+1})-(C_bH_{2b})-CCO-(C_rH_{2r})-COO-$.

In the above formulae, a, b, and r have the same definitions as described above.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

(Other Additives)

In addition, the liquid crystal composition may include at least one selected from various additives such as a polymerizable monomer. In addition, optionally, a polymerization inhibitor, an antioxidant, an ultraviolet absorber, a light stabilizer, a coloring material, metal oxide particles or the like can be added to the liquid crystal composition in a range where optical performance does not deteriorate.

(Solvent)

The solvent used for preparing the liquid crystal composition is not particularly limited and may be appropriately selected depending on the liquid crystal compound to be added to the composition and the like.

As a solvent, an organic solvent is preferably used. The organic solvent is not particularly limited and can be appropriately selected depending on the liquid crystal compound to be added to the composition and the like. Examples of the organic solvent include a ketone, an alkyl halide, an amide, a sulfoxide, a heterocyclic compound, a hydrocarbon, an ester, and an ether. Among these, a ketone is more preferable in consideration of an environmental burden.

As the solvent, one kind may be used alone, or two or more kinds may be used in combination.

[Formation of Reflective Layer]

The first reflective layer 16 (cholesteric liquid crystal layer) can be formed by dissolving the liquid crystal compound, the chiral agent, and the polymerization initiator and further the optionally added surfactant or the like in a solvent to prepare a liquid crystal composition, applying the liquid crystal composition to the underlayer 14, drying the liquid crystal composition to obtain a coating film, and irradiating the coating film with an actinic ray to cure the liquid crystal composition. As a result, the first reflective layer 16 having a cholesteric liquid crystal structure in which cholesteric regularity is immobilized can be formed.

By applying the liquid crystal composition to the underlayer 14 to form the first reflective layer 16 without performing an alignment treatment such as rubbing on the underlayer 14, the first reflective layer having the flapping structure can be formed as described above. In addition, by performing light irradiation for changing the HTP of the chiral agent before or during the curing of the liquid crystal composition, the first reflective layer 16 having the PG structure can also be formed as described above.

Using the same method as described above, the second reflective layer 18 may be formed on the first reflective layer 16 after the formation of the first reflective layer 16. The second reflective layer 18 follows the alignment of the surface of the first reflective layer 16. Therefore, the second reflective layer 18 also has the flapping structure as described above. In addition, in a case where three or more reflective layers are formed, another reflective layer can be formed on the reflective layer using the same method as described above.

(Application and Alignment)

A method of applying the liquid crystal composition is not particularly limited and may be appropriately selected depending on properties of the coating composition, the materials for forming the underlayer 14 and the support 12, and the like.

Examples of the method of applying the liquid crystal composition include a wire bar coating method, a curtain coating method, an extrusion coating method, a direct gravure coating method, a reverse gravure coating method, a die coating method, a spin coating method, a dip coating method, a spray coating method, and a slide coating method.

In addition, the liquid crystal composition may be applied to the underlayer 14 (the first reflective layer 16) by transferring the liquid crystal composition that is separately applied to the support. In addition, droplets of the liquid crystal composition can also be jetted. Examples of the jetting method include an ink jet method.

By heating the applied liquid crystal composition, liquid crystal molecules are aligned. The heating temperature is preferably 200° C. or lower and more preferably 130° C. or lower. Through the alignment treatment, a structure in which the liquid crystal compound is twisted and aligned to have a helical axis can be obtained.

(Curing of Liquid Crystal Composition)

Next, by polymerizing the aligned liquid crystal compound, the liquid crystal composition can be cured to form a reflective layer. Regarding the polymerization of the polyfunctional liquid crystal compound, thermal polymerization or photopolymerization may be performed, and photopolymerization is preferable.

It is preferable that light irradiation for curing the liquid crystal composition is performed by ultraviolet irradiation. The illuminance of ultraviolet light is preferably 15 to 1500 mW/cm$^2$ and more preferably 100 to 600 mW/cm$^2$. In addition, the irradiation energy of ultraviolet light is preferably 20 mJ/cm$^2$ to 50 J/cm$^2$ and more preferably 100 to 1500 mJ/cm$^2$.

A wavelength of ultraviolet light to be irradiated may be appropriately selected depending on the liquid crystal compound in the liquid crystal composition and the like. In order to cure the liquid crystal composition, a light source having an emission wavelength of 200 to 430 nm is preferable, and a light source having an emission wavelength of 300 to 430 nm is more preferable. In addition, during ultraviolet irradiation, from the viewpoint of preventing a decomposition, side reaction, or the like of a material to be used, for example, a short wavelength cut filter may be used to suppress the transmittance of light having a wavelength of 300 nm or shorter to be 20% or lower.

In a case where the cholesteric liquid crystal layer having the PG structure is formed, light irradiation for changing the HTP of the chiral agent is performed before the curing of the liquid crystal composition. Alternatively, in a case where the cholesteric liquid crystal layer having the PG structure is formed, light irradiation for changing the HTP of the chiral agent and light irradiation for curing the liquid crystal composition may be performed at the same time.

During the formation of the reflective layer, in order to promote the change of the HTP of the chiral agent, it is preferable that ultraviolet irradiation is performed after heating. During the ultraviolet irradiation for promoting the change of the HTP of the chiral agent, the oxygen concentration is not particularly limited. Accordingly, the ultraviolet irradiation may be performed in an oxygen atmosphere or in a low oxygen atmosphere. Further, it is preferable that the ultraviolet irradiation for promoting the photopolymerization reaction of the liquid crystal compound is performed under heating and/or in a low oxygen atmosphere.

In order to prevent the cholesteric liquid crystal layer from being disordered, it is preferable that the temperature during the ultraviolet irradiation is maintained in a temperature range where the cholesteric liquid crystalline phase is exhibited. Specifically, the temperature during the ultraviolet irradiation is preferably 25° C. to 140° C. and more preferably 30° C. to 100° C.

In addition, the low oxygen atmosphere during the ultraviolet irradiation may be formed by reducing the oxygen concentration in the atmosphere using a well-known method such as nitrogen substitution. The oxygen concentration is preferably 5000 ppm or lower, more preferably 100 ppm or lower, and still more preferably 50 ppm or lower.

From the viewpoint of stability, the polymerization degree after curing the liquid crystal composition is preferably high, and is preferably 50% or higher and more preferably 60% or higher. The polymerization degree can be determined by measuring a consumption ratio between polymerizable functional groups using an IR absorption spectrum.

<Use of Reflective Sheet>

The reflective sheet according to the embodiment of the present invention can be used for various applications such as a decorative sheet, a light reflection member, a light diffusion plate, a half mirror, a transparent screen, an imaging element, a sensor, an optical device, or other optical elements. For example, in an aspect where the reflective sheet according to the embodiment of the present invention is used for an optical device including: the reflective sheet and an element using light transmitted through the reflective sheet, by using the reflective sheet according to the embodiment of the present invention, light reflected from a surface or the like of the element using light transmitted through the reflective sheet can be prevented from reaching the outside of the optical device, and thus the element using light transmitted through the reflective sheet can be made to be inconspicuous.

The element using light transmitted through the reflective sheet used in the present invention is not particularly limited, and various elements such as an imaging element or a sensor can be used. In this case, the reflective sheet according to the embodiment of the present invention may be used as a decorative sheet, for example, after being bonded to an optical filter such as a SC filter (manufactured by Fujifilm Corporation) or an IR filter (manufactured by Fujifilm Corporation). As a result, decoration corresponding to a light receiving wavelength of an element such as an imaging element or a sensor can be made.

In addition, an image display device including the reflective sheet according to the embodiment of the present invention and an image display element may be provided.

As the image display element, various well-known image display elements can be used. For example, a liquid crystal display element or an organic electroluminescence display element can be used.

Further, the reflective sheet according to the embodiment of the present invention can also be used for an optical element. For example, the reflective sheet according to the embodiment of the present invention can also be used for a general half mirror or for an application described in paragraph "0017" of JP2017-092021A.

EXAMPLES

Hereinafter, the present invention will be described in detail using Examples. Materials, reagents, amounts thereof, proportions thereof, operations, and the like shown in the following examples can be appropriately changed as long as they do not depart from the scope of the present invention. Accordingly, the present invention is not limited to the following examples.

<Formation of Underlayer 1>

As a support, a PET film (COSMOSHINE A4100, manufactured by Toyobo Co., Ltd.) having a thickness of 50 μm was prepared. This PET film includes an easily adhesive layer on one surface.

An underlayer-forming coating solution 1 having the following composition was applied to a surface of the PET film where the easily adhesive layer was not provided using a #3.6 wire bar coater. Next, the laminate was applied was dried at 45° C. for 60 seconds and was irradiated with ultraviolet light at 500 mJ/cm$^2$ at 25° C. using an ultraviolet irradiation device. As a result, the support 1 with the underlayer 1 having a thickness of 1.4 μm was prepared.

[Underlayer-Forming Coating Solution 1]
KAYARAD PET30 (manufactured by Nippon Kayaku Co., Ltd.) . . . 100 parts by mass
IRGACURE 907 (manufactured by Ciba-Geigy) . . . 3.0 parts by mass
KAYACURE DETX (manufactured by Nippon Kayaku Co., Ltd.) . . . 1.0 part by mass
The following surfactant F1 . . . 0.01 parts by mass
Methyl isobutyl ketone . . . 243 parts by mass
Surfactant F1

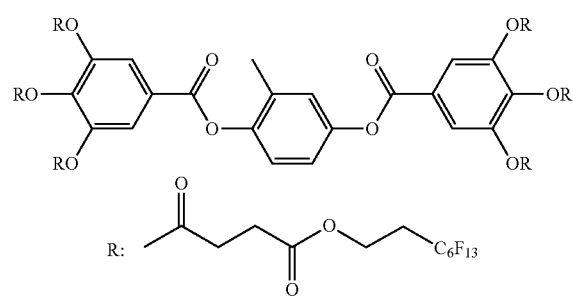

<Chiral Agent>

The following three chiral agents A to C were prepared. Using any one of the chiral agents, a first reflective layer and a second reflective layer described below were formed.

Chiral Agent A

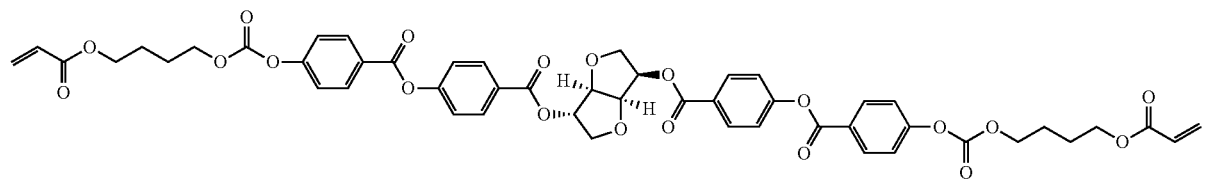 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

Chiral Agent B

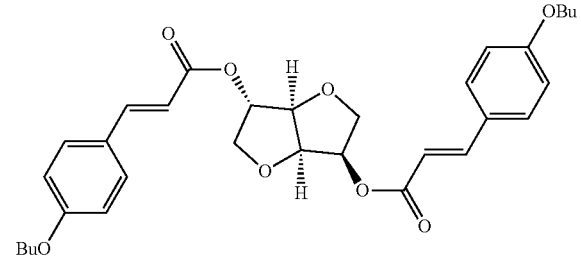

Chiral Agent C

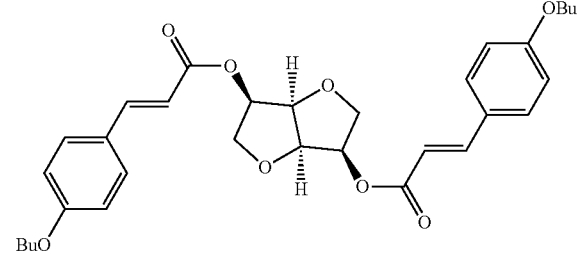

The chiral agents A and B are chiral agents that form a right-handed helix. In addition, the chiral agent C is a chiral agent that forms a left-handed helix. The chiral agents B and C are chiral agents having a cinnamoyl group, and the chiral agent A is a chiral agent not having a cinnamoyl group.

Regarding each of the chiral agents A to C, a maximum molar absorption coefficient, a maximum wavelength at which the molar absorption coefficient is maximum is obtained, and a molar absorption coefficient at a wavelength of 313 nm are shown in Table 1 below.

TABLE 1

|  | εMAX | Maximum Wavelength | ε@313 | Cinnamoyl Group |
| --- | --- | --- | --- | --- |
| Chiral Agent A | 70300 | 296 nm | 35000 | None |
| Chiral Agent B | 56000 | 314 nm | 55000 | Present |
| Chiral Agent C | 54000 | 312 nm | 53000 | Present |

In Table 1, εMAX represents the maximum molar absorption coefficient, and ε@313 represents a molar absorption coefficient at 313 nm.

Comparative Example 1

[Formation of First Reflective Layer]
A composition shown below was stirred and dissolved in a container held at 25° C. to prepare an reflective layer-forming coating solution Ch-B.
(Reflective Layer-Forming Coating Solution Ch-B)
Methyl ethyl ketone . . . 144.9 parts by mass
Mixture of the following rod-shaped liquid crystal compounds . . . 100.0 parts by mass
Photopolymerization Initiator A . . . 0.02 parts by mass
Photopolymerization Initiator B . . . 1.00 part by mass
Chiral agent B . . . 6.10 parts by mass
The above-described surfactant F1 . . . 0.027 parts by mass
The following surfactant F2 . . . 0.067 parts by mass
Mixture of Rod-Shaped Liquid Crystal Compounds

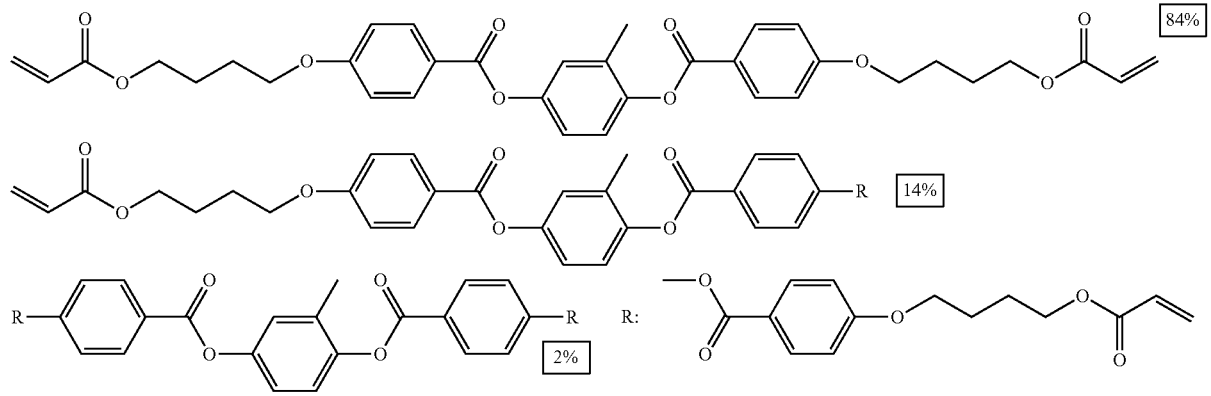

In the above-described mixture, a numerical value is represented by mass %. In addition, R represents a group to be bonded to an oxygen atom. In addition, an average molar absorption coefficient of the rod-shaped liquid crystal compound at a wavelength of 300 to 400 nm was 140/mol·cm.

Photopolymerization initiator A: IRGACURE 907 (manufactured by Ciba-Geigy)
Photopolymerization initiator B: KAYACURE DETX (manufactured by Nippon Kayaku Co., Ltd.)
Surfactant F2

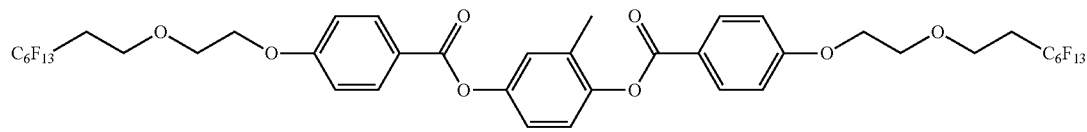

The prepared first reflective layer-forming coating solution Ch-B was applied using a #10.5 wire bar coater to the surface of the support including the prepared underlayer 1, and was dried at 105° C. for 60 seconds.
Next by irradiating the coating film with light from a metal halide lamp in a low oxygen atmosphere (100 ppm or lower) at 40° C. and an irradiation dose of 60 mJ through an optical filter SH0350 (manufactured by Asahi Spectra Co., Ltd.) and further irradiating the coating film with light from a metal halide lamp at 100° C. and an irradiation dose of 500 mJ, a first reflective layer as a cholesteric liquid crystal layer was prepared.

[Formation of Second Reflective Layer]
A composition shown below was stirred and dissolved in a container held at 25° C. to prepare an reflective layer-forming coating solution Ch-C.
(Reflective Layer-Forming Coating Solution Ch-C)
Methyl ethyl ketone . . . 150.6 parts by mass
Mixture of the rod-shaped liquid crystal compounds . . . 100.0 parts by mass
Photopolymerization Initiator B . . . 0.50 part by mass
Chiral agent C . . . 11.00 parts by mass
The above-described surfactant F1 . . . 0.027 parts by mass
The above-described surfactant F2 . . . 0.067 parts by mass The prepared reflective layer-forming coating solution Ch-C was applied using a #6 wire bar coater to the surface of the prepared first reflective layer, and was dried at 105° C. for 60 seconds.

Next by irradiating the coating film with light from a metal halide lamp in a low oxygen atmosphere (100 ppm or lower) at 75° C. and an irradiation dose of 60 mJ through an optical filter SH0350 (manufactured by Asahi Spectra Co., Ltd.) and further irradiating the coating film with light from a metal halide lamp at 100° C. and an irradiation dose of 500 mJ, a second reflective layer as a cholesteric liquid crystal layer was formed, and a reflective sheet was prepared.

Comparative Example 2

The prepared first reflective layer-forming coating solution Ch-C was applied using a #10.5 wire bar coater to the surface of the support including the prepared underlayer 1, and was dried at 105° C. for 60 seconds.
Next by irradiating the coating film with light from a metal halide lamp in a low oxygen atmosphere (100 ppm or lower) at 75° C. and an irradiation dose of 60 mJ through an optical filter SH0350 (manufactured by Asahi Spectra Co., Ltd.) and further irradiating the coating film with light from a metal halide lamp at 100° C. and an irradiation dose of 500 mJ, a first reflective layer as a cholesteric liquid crystal layer was formed.

Next, the reflective layer-forming coating solution Ch-B was applied using a #10.5 wire bar coater to the surface of the formed first reflective layer, and was dried at 105° C. for 60 seconds.

Next by irradiating the coating film with light from a metal halide lamp in a low oxygen atmosphere (100 ppm or lower) at 40° C. and an irradiation dose of 60 mJ through an optical filter SH0350 (manufactured by Asahi Spectra Co., Ltd.) and further irradiating the coating film with light from a metal halide lamp at 100° C. and an irradiation dose of 500 mJ, a second reflective layer as a cholesteric liquid crystal layer was formed, and a reflective sheet was prepared.

Examples 1 to 9, 11, and 12

A first reflective layer and a second reflective layer as cholesteric liquid crystal layers were formed using the same method as that of Comparative Example 2, except that the count of the wire bar coater was changed. Using the first reflective layer and the second reflective layer, a reflective sheet was prepared.

In Example 8, a PC film (manufactured by Sumitomo Chemical Co., Ltd., TECHNOLLOY) having a thickness of 50 μm was used as the support instead of the PET film, and an underlayer 3 was prepared using the same method as that of the underlayer 1, except that the count of the wire bar coater was changed to #13.

In addition, in Example 9, the first reflective layer was formed directly on the surface of the support (PET film) without forming the underlayer.

Further, in Examples 6 and 7, the underlayer 2 was formed using the following underlayer-forming coating solution 2 instead of the underlayer 1.

The details are shown in Table 2 below.
(Underlayer-Forming Coating Solution 2)
KAYARAD PET30 (manufactured by Nippon Kayaku Co., Ltd.) . . . 50 parts by mass
DCP (manufactured by Shin-Nakamura Chemical Co., Ltd.) . . . 50 parts by mass
IRGACURE 907 (manufactured by Ciba-Geigy) . . . 3.0 parts by mass
KAYACURE DETX (manufactured by Nippon Kayaku Co., Ltd.) . . . 1.0 part by mass
The above-described surfactant F1 . . . 0.01 parts by mass
Methyl isobutyl ketone . . . 243 parts by mass Comparative Example 3 and Example 10

A first reflective layer and a second reflective layer were formed using the same method as that of Comparative Example 1, except that the following reflective layer-forming coating solution Ch-A was used for forming the first reflective layer and the count of the wire bar coater during the formation of the first reflective layer and the second reflective layer was changed. Using the first reflective layer and the second reflective layer, a reflective sheet was prepared.
(Reflective Layer-Forming Coating Solution Ch-A)
Methyl ethyl ketone . . . 144.9 parts by mass
Mixture of the rod-shaped liquid crystal compounds . . . 100.0 parts by mass
Photopolymerization Initiator A . . . 0.02 parts by mass
Photopolymerization Initiator B . . . 1.00 part by mass
Chiral agent A . . . 6.10 parts by mass
The above-described surfactant F1 . . . 0.027 parts by mass
The above-described surfactant F2 . . . 0.067 parts by mass <Verification of Thickness, Flapping Structure, and PG Structure of Reflective Layer>

A cross-section of the prepared reflective sheet was observed with a SEM, and the thicknesses of the first reflective layer and the second reflective layer were verified from the SEM image. Further, whether or not each of the reflective layers had the flapping structure and the PG structure was verified.

A case where the each of the reflective layers had the flapping structure was evaluated as "A", and a case where the each of the reflective layers did not have the flapping structure was evaluated as "B".

A case where the each of the reflective layers had the PG structure was evaluated as "A", and a case where the each of the reflective layers did not have the PG structure was evaluated as "B".

<Evaluation>

The prepared reflective sheet was evaluated as follows.

[Measurement of Integral Reflectivity]

Using a device in which a large integrating sphere device (ILV-471, manufactured by JASCO Corporation) was attached to a spectrophotometer (V-550, manufactured by JASCO Corporation), an integral reflection spectrum of the reflective sheet was measured to include specularly reflected light without using optical trap such that light was incident from the second reflective layer of the reflective sheet. In the obtained integral reflection spectrum, a maximum reflectivity [%] in a wavelength range of 350 to 750 nm was obtained as a maximum integral reflectivity.

[Measurement of Specular Reflectivity]

Using a device in which a large integrating sphere device (ILV-471, manufactured by JASCO Corporation) was attached to a spectrophotometer (V-550, manufactured by JASCO Corporation), an specular reflection spectrum of the reflective sheet at an incidence angle of 5° was measured such that light was incident from the second reflective layer of the reflective sheet. In the obtained specular reflection spectrum, a maximum specular reflectivity [%] in a wavelength range of 350 to 750 nm was obtained as a maximum specular reflectivity.

<Half-Width>

A half-width [nm] of the integral reflection spectrum was measured as described above from the measured integral reflection spectrum.

[Average Value of Inter-Peak Distances of Flapping Structure]

An average value [nm] of inter-peak distances of the flapping structure was measured as described above from the cross-sectional SEM image of the reflective sheet. The inter-peak distance refers to the average value of the first reflective layer and the second reflective layer.

[Recognition of Unevenness]

The surface shape of the prepared reflection film was observed with a fluorescent lamp, and unevenness in a region excluding portions of 50 mm from both ends of the coating portion was evaluated.

A: Annual ring-shaped unevenness was observed
B: Annual ring-shaped unevenness was slightly observed but was allowable
C: Annual ring-shaped unevenness was clearly observed and was not allowable The results are shown in Table 2 below.

TABLE 2

| | | | Comparative Example | | | Example | | | | | | | | | | | | |
|---|---|---|---|---|---|---|---|---|---|---|---|---|---|---|---|---|---|---|
| | | | 1 | 2 | 3 | 1 | 2 | 3 | 4 | 5 | 6 | 7 | 8 | 9 | 10 | 11 | 12 |
| Second Reflective Layer | | Thickness [μm] | 2.6 | 4.6 | 3.8 | 4.6 | 4.1 | 4.1 | 6.1 | 6.1 | 6.1 | 7.2 | 6.1 | 6.1 | 6.1 | 6.1 | 7.2 |
| | Chiral Agent | Kind | C | B | C | B | B | B | B | B | B | B | B | B | C | B | B |
| | | Addition Amount [Part(s) by Mass] | 11 | 6.1 | 11 | 6.1 | 6.1 | 6.1 | 6.1 | 6.1 | 6.1 | 6.1 | 6.1 | 6.1 | 11 | 6.1 | 6.1 |
| | Initiator | Addition Amount A [Part(s) by Mass] | — | 0.02 | — | 0.02 | 0.02 | 0.02 | 0.02 | 0.02 | 0.02 | 0.02 | 0.02 | 0.02 | — | 0.02 | — |
| | | Addition Amount B [Part(s) by Mass] | 0.5 | 1 | 0.5 | 1 | 1 | 1 | 1 | 1 | 1 | 1 | 1 | 1 | 0.5 | 1 | 1 |
| | Flapping Structure | | A | A | A | A | A | A | A | A | A | A | A | A | A | A | A |
| | PG structure | | A | A | A | A | A | A | A | A | A | A | A | A | A | A | A |
| First Reflective Layer | | Thickness (μm) | 4.6 | 4.6 | 4.6 | 1.5 | 2.8 | 3.4 | 3.5 | 2.6 | 2.6 | 2.6 | 2.6 | 2.6 | 2.6 | 3.8 | 3.5 |
| | Chiral Agent | Kind | B | C | A | C | C | C | C | C | C | C | C | C | A | C | C |
| | | Addition Amount [Part(s) by Mass] | 6.1 | 11 | 6.1 | 11 | 11 | 11 | 11 | 11 | 11 | 11 | 11 | 11 | 6.1 | 11 | 11 |
| | Initiator | Addition Amount A [Part(s) by Mass] | 0.02 | — | 0.02 | — | — | — | — | — | — | — | — | — | 0.02 | — | — |
| | | Addition Amount B [Part(s) by Mass] | 1 | 0.5 | 1 | 0.5 | 0.5 | 0.5 | 0.5 | 0.5 | 0.5 | 0.5 | 0.5 | 0.5 | 1 | 0.5 | 0.3 |
| | Flapping Struture | | A | A | A | A | A | A | A | A | A | A | A | A | A | A | A |
| | PG structure | | A | A | B | A | A | A | A | A | A | A | A | A | B | A | A |
| Underlayer | | | 1 | 1 | 1 | 1 | 1 | 1 | 1 | 1 | 2 | 2 | 3 | — | 1 | 1 | 1 |
| Support (Thickness: 50 μm) | | | PET | PET | PET | PET | PET | PET | PET | PET | PET | PET | PC | PET | PET | PET | PET |
| Evaluation | Integral Reflectivity [%] | | 62 | 70 | 83 | 60 | 64 | 69 | 79 | 75 | 75 | 80 | 75 | 75 | 80 | 81 | 70 |
| | Specular Reflectivity [%] | | 13 | 14 | 13 | 13 | 13 | 13 | 13 | 13 | 13 | 13 | 13 | 28 | 14 | 13 | 13 |
| | Half-Width [nm] | | 109 | 111 | 98 | 104 | 105 | 106 | 112 | 111 | 111 | 113 | 118 | 110 | 101 | 114 | 183 |
| | Inter-Peak Distance [nm] | | 7.3 | 7.3 | 7.2 | 7.2 | 7.4 | 7.3 | 7.2 | 7.2 | 7.3 | 7.2 | 7.5 | 42 | 7.4 | 7.4 | 7.4 |
| | Unevenness Recognition | | C | C | C | A | A | B | A | A | A | A | A | A | A | B | A |

In Table 2, the integral reflectivity represents the maximum integral reflectivity, and the specular reflectivity represents the maximum specular reflectivity.

In addition, the half-width represents the half-width of the integral reflection spectrum.

Further, the inter-peak distance represents the average value of inter-peak distances of the flapping structure.

As can be seen from Table 2, in the reflective sheet according to the embodiment of the present invention where two reflective layers formed of a cholesteric liquid crystal layer are provided, all the reflective layers have the flapping structure, at least one of the reflective layers has the PG structure, and the thickness of the first reflective layer as the lower reflective layer is less than that of the second reflective layer, a selective reflection wavelength range is wide, diffusion reflection properties are excellent, and excellent properties such as inconspicuous unevenness caused by defects of the flapping structure are obtained.

In addition, as in Examples 2 and 3, by setting the thickness of the second reflective layer to be more than that of the first reflective layer by 1 µm or more, unevenness caused by defects of the flapping structure can be more favorably prevented from being conspicuous. Further, as in Examples 5 and 10, by allowing both the first reflective layer and the second reflective layer to have the PG structure, the half-width can be widened, that is, a selective reflection wavelength range can be widened.

On the other hand, in comparative Examples 1 and 3 where the thickness of the first reflective layer as the lower reflective layer was more than that of the second reflective layer although two reflective layers were provided, and in Comparative Example 2 where the thicknesses of the first reflective layer and the second reflective layer were the same, unevenness was conspicuous, and there was a problem in quality.

In Examples 6 and 7 where the underlayer 2 was used as the underlayer, the support was easily peelable after applying a pressure sensitive adhesive to the second reflective layer and bonding the second reflective layer to another sheet-shaped material.

As can be seen from the above results, the effects of the present invention are obvious.

EXPLANATION OF REFERENCES

10: reflective sheet
12: support
14: underlayer
16: first reflective layer
18: second reflective layer
30: substrate
32, 34: cholesteric liquid crystal layer
B: bright portion
D: dark portion
p: distance

What is claimed is:

1. A reflective sheet comprising:
   a plurality of reflective layers that are laminated, the reflective layers being obtained by immobilizing a cholesteric liquid crystalline phase,
   wherein in a cross-section of the reflective layer observed with a scanning electron microscope, at least a part of bright portions and dark portions derived from the cholesteric liquid crystalline phase has a flapping structure, the bright portions and the dark portions appearing in a cross-sectional view of the reflective layers observed with a scanning electron microscope,
   at least one of the reflective layers has a pitch gradient structure that is a structure in which a helical pitch in a thickness direction gradually increases, and
   in a case where a reflective layer that is formed on a surface other than a surface of the reflective layer among the plurality of reflective layers that are laminated is set as a lower reflective layer, a thickness of the lower reflective layer is less than those of other reflective layers than the lower reflective layer in the reflective layers.

2. The reflective sheet according to claim 1,
   wherein the thickness of the lower reflective layer is 3.5 µm or less.

3. The reflective sheet according to claim 1,
   wherein a thickness of at least one of the reflective layers other than the lower reflective layer is 4 µm or more.

4. The reflective sheet according to claim 1,
   wherein a thickness of at least one of the reflective layers other than the lower reflective layer is more than that of the lower reflective layer by 1 µm or more.

5. The reflective sheet according to claim 1,
   wherein at least one of the reflective layers other than the lower reflective layer has the pitch gradient structure.

6. The reflective sheet according to claim 5,
   wherein all the reflective layers including the lower reflective layer and the other reflective layers have the pitch gradient structure.

7. The reflective sheet according to claim 1,
   wherein a half-width of an integral reflection spectrum is 100 nm or more when an integral reflection spectrum of the reflective sheet is measured.

8. The reflective sheet according to claim 1,
   wherein an average value of inter-peak distances in the flapping structures of the reflective layers is 0.5 to 50 µm.

9. The reflective sheet according to claim 1,
   wherein the number of the reflective layers is two.

10. The reflective sheet according to claim 1, further comprising:
    a support; and
    an underlayer that is provided on one surface of the support,
    wherein the lower reflective layer is adjacent to the underlayer.

11. The reflective sheet according to claim 1, further comprising:
    a support,
    wherein the lower reflective layer is adjacent to the support.

12. The reflective sheet according to claim 10,
    wherein the support is peelable.

13. The reflective sheet according to claim 11,
    wherein the support is peelable.

* * * * *